US012335387B2

(12) United States Patent
Cucu et al.

(10) Patent No.: US 12,335,387 B2
(45) Date of Patent: Jun. 17, 2025

(54) DISTRIBUTING AND SYNCHRONIZING ENCRYPTED DATA FOR MULTI-REGIONAL ACCESSIBILITY

(71) Applicant: Adobe Inc., San Jose, CA (US)

(72) Inventors: Andrian Cucu, Bucharest (RO); Bogdan Teodor Motrogan, Bucharest (RO); Marius Catalin Catana, Bucharest (RO)

(73) Assignee: Adobe Inc., San Jose, CA (US)

( * ) Notice: Subject to any disclaimer, the term of this patent is extended or adjusted under 35 U.S.C. 154(b) by 398 days.

(21) Appl. No.: 17/521,087

(22) Filed: Nov. 8, 2021

(65) Prior Publication Data

US 2023/0145340 A1    May 11, 2023

(51) Int. Cl.
*H04L 9/08* (2006.01)
*G06F 16/18* (2019.01)
(Continued)

(52) U.S. Cl.
CPC .......... *H04L 9/0891* (2013.01); *G06F 16/182* (2019.01); *G06F 16/1873* (2019.01); *H04L 9/0643* (2013.01); *H04L 9/0819* (2013.01)

(58) Field of Classification Search
CPC ... H04L 9/0891; H04L 9/0643; H04L 9/0819; H04L 9/12; H04L 9/0894; G06F 16/182; G06F 16/1873; G06F 21/602
See application file for complete search history.

(56) References Cited

U.S. PATENT DOCUMENTS

| 7,451,147 B1 * | 11/2008 | Kao | H04L 9/0894 |
| | | | 707/999.102 |
| 8,538,029 B2 * | 9/2013 | Li | H04L 9/085 |
| | | | 380/279 |

(Continued)

FOREIGN PATENT DOCUMENTS

| CN | 101989984 A | * | 3/2011 | |
| CN | 107124271 A | * | 9/2017 | ........... H04L 63/062 |

(Continued)

OTHER PUBLICATIONS

Tristan L. Moore, "Encryption Methods and Key Management Services for Secure Cloud Computing: A Review", Conference: Midwest Instruction and Computing Symposium—2023 (MICS-2023)at: University of Northern Iowa, Cedar Falls, Iowa, USA, 18 pages (Year: 2023).*

(Continued)

*Primary Examiner* — Shahriar Zarrineh
(74) *Attorney, Agent, or Firm* — Keller Preece PLLC

(57) ABSTRACT

This disclosure describes one or more implementations of systems, non-transitory computer-readable media, and methods that create a secured, versioned, and resilient multi-region caching of digital secrets and application credentials that facilitates scalability of digital secrets without compromising the security of the digital secrets. In particular, in one or more embodiments, the disclosed systems leverage envelope encryption along with management keys of a key management system to cache encrypted data packages that include encrypted digital secrets and encrypted envelope keys at regional storage servers. Furthermore, in some embodiments, the disclosed systems access encrypted digital secrets through regional storage servers by decrypting envelope keys through a key manage- (Continued)

ment system and utilizing the envelope keys to extract digital secrets from the encrypted data packages.

20 Claims, 10 Drawing Sheets

(51) Int. Cl.
  *G06F 16/182* (2019.01)
  *H04L 9/06* (2006.01)

(56) References Cited

U.S. PATENT DOCUMENTS

| | | | | |
|---|---|---|---|---|
| 9,864,874 | B1* | 1/2018 | Shanbhag | H04L 63/10 |
| 10,523,434 | B1* | 12/2019 | Sharifi Mehr | H04L 9/0891 |
| 10,721,062 | B2* | 7/2020 | Chen | H04L 9/0869 |
| 10,963,593 | B1* | 3/2021 | Campagna | H04L 9/0861 |
| 11,275,825 | B1* | 3/2022 | Kapinos | H04L 9/0894 |
| 11,502,842 | B2* | 11/2022 | Edwards | H04L 9/0819 |
| 11,640,484 | B1* | 5/2023 | Kumar | G06F 21/6209 |
| | | | | 726/26 |
| 11,799,633 | B1* | 10/2023 | Cartagena | H04L 9/0825 |
| 2009/0296926 | A1* | 12/2009 | Perlman | H04L 9/0866 |
| | | | | 380/44 |
| 2015/0186657 | A1* | 7/2015 | Nakhjiri | H04L 9/0836 |
| | | | | 713/193 |
| 2016/0092540 | A1* | 3/2016 | Bihani | G06F 16/256 |
| | | | | 707/624 |
| 2016/0119312 | A1* | 4/2016 | Armstrong | H04L 9/0863 |
| | | | | 713/171 |
| 2017/0126698 | A1* | 5/2017 | Minkovich | G06F 21/00 |
| 2017/0373847 | A1* | 12/2017 | Chien | H04L 9/3221 |
| 2018/0316502 | A1* | 11/2018 | Nadeau | H04L 9/0891 |
| 2018/0336361 | A1* | 11/2018 | Gilani | G06Q 30/018 |
| 2019/0238331 | A1* | 8/2019 | Chandra | H04L 9/0861 |
| 2019/0268144 | A1* | 8/2019 | Hirota | H04L 9/0891 |
| 2019/0306138 | A1* | 10/2019 | Carru | H04L 9/3247 |
| 2019/0384920 | A1* | 12/2019 | Kludy | H04W 12/068 |
| 2020/0287880 | A1* | 9/2020 | Getsin | H04L 9/0894 |
| 2020/0326892 | A1* | 10/2020 | Caruana | G06F 9/45558 |
| 2021/0182422 | A1* | 6/2021 | Basu | H04L 9/3213 |
| 2021/0306150 | A1* | 9/2021 | Connard | H04L 9/083 |
| 2021/0365547 | A1* | 11/2021 | Atkinson | H04L 9/0894 |
| 2021/0367768 | A1* | 11/2021 | Agrawal | H04L 9/083 |
| 2022/0385464 | A1* | 12/2022 | Anand | H04L 9/0894 |
| 2023/0078187 | A1* | 3/2023 | Kennedy | H04L 63/062 |
| | | | | 380/279 |
| 2023/0081068 | A1* | 3/2023 | Nguyen | H04L 9/0877 |
| | | | | 713/189 |

FOREIGN PATENT DOCUMENTS

| | | | | |
|---|---|---|---|---|
| CN | 107911343 | A * | 4/2018 | H04L 63/06 |
| CN | 108235772 | A * | 6/2018 | G06Q 20/3829 |
| CN | 109873879 | A * | 6/2019 | |
| CN | 110059458 | A * | 7/2019 | G06F 21/31 |
| CN | 111899082 | A * | 11/2020 | G06F 21/602 |
| CN | 112235301 | A * | 1/2021 | H04L 63/0428 |
| CN | 113626836 | A * | 11/2021 | |
| CN | 114153838 | A * | 3/2022 | |
| EP | 3644574 | B1 * | 8/2021 | G06F 16/2246 |
| KR | 20180046593 | A * | 5/2018 | |
| KR | 102386614 | B1 * | 5/2022 | |
| KR | 20220072311 | A * | 6/2022 | |
| KR | 102647433 | B1 * | 3/2024 | |
| WO | WO-2016063254 | A1 * | 4/2016 | G06F 21/6218 |
| WO | WO-2022002350 | A1 * | 1/2022 | G06F 21/602 |

OTHER PUBLICATIONS

Tongfei Yao, "Cross-regional Cross-level Encryption Collaborative Data Transmission", Journal of Computers vol. 31 No. 1, 2020, pp. 166-175 , doi:10.3966/199115992020023101013, Revised Oct. 19, 2019; Accepted Oct. 29, 2019 , 10 pages (Year: 2019).*

Amazon.com; AWS Key Management Service (KMS): Easily create and control the keys used to encrypt or digitally sign your data; Date downloaded Feb. 28, 2022; https://web.archive.org/web/20211102022239/https://aws.amazon.com/kms/.

Microsoft.com; Azure; Key Vault; Safeguard cryptographic keys and other secrets used by cloud apps and services; Date downloaded Feb. 28, 2022; https://azure.microsoft.com/en-us/services/key-vault/.

* cited by examiner

DISTRIBUTING AND SYNCHRONIZING ENCRYPTED DATA FOR MULTI-REGIONAL ACCESSIBILITY

BACKGROUND

In recent years, many computing devices and application services have utilized data encryption to improve data security. For example, conventional systems often encrypt digital data utilizing a secured encryption management service. In particular, conventional systems often upload data to encryption management services that encrypt the data and manage secure access to the encrypted data from computing devices and application services. Although these conventional systems increase the security of digital data, as further explained below, these conventional systems have a number of technical shortcomings with regard to flexibly and efficiently scaling the encryption of digital secrets and providing resilient accessibility to the encrypted digital secrets.

SUMMARY

One or more embodiments described herein provide benefits and solve one or more of the foregoing or other problems in the art with systems, methods, and non-transitory computer readable media that create a secured, versioned, and resilient multi-region caching of digital secrets that facilitate scalability of digital secrets without compromising security. In particular, in one or more embodiments, the disclosed systems leverage envelope encryption along with management keys of a key management system to generate and cache encrypted data packages. For example, the disclosed systems generate encrypted envelope keys using management keys of a key management system, utilize the envelope key to generate encrypted digital secrets, and then combine the encrypted envelope key and the encrypted digital secrets as part of an encrypted data package.

In one or more embodiments, the disclosed systems cache encrypted data packages at regional storage servers that can be accessed by regional computing devices. Specifically, regional computing devices can utilize the management keys via the key management system to access the envelope key from the encrypted data package and utilize the envelope key to determine one or more digital secrets. By utilizing this approach, the disclosed systems can improve flexibility and volume of digital secrets and also reduce throttling of decryption operations. In addition, the disclosed systems can version and synchronize the encrypted data packages across multiple regional storage servers for reduced latency and improved resiliency to downtime caused through centralized storage and distribution.

BRIEF DESCRIPTION OF THE DRAWINGS

The detailed description is described with reference to the accompanying drawings in which.

DETAILED DESCRIPTION

Figure 1:
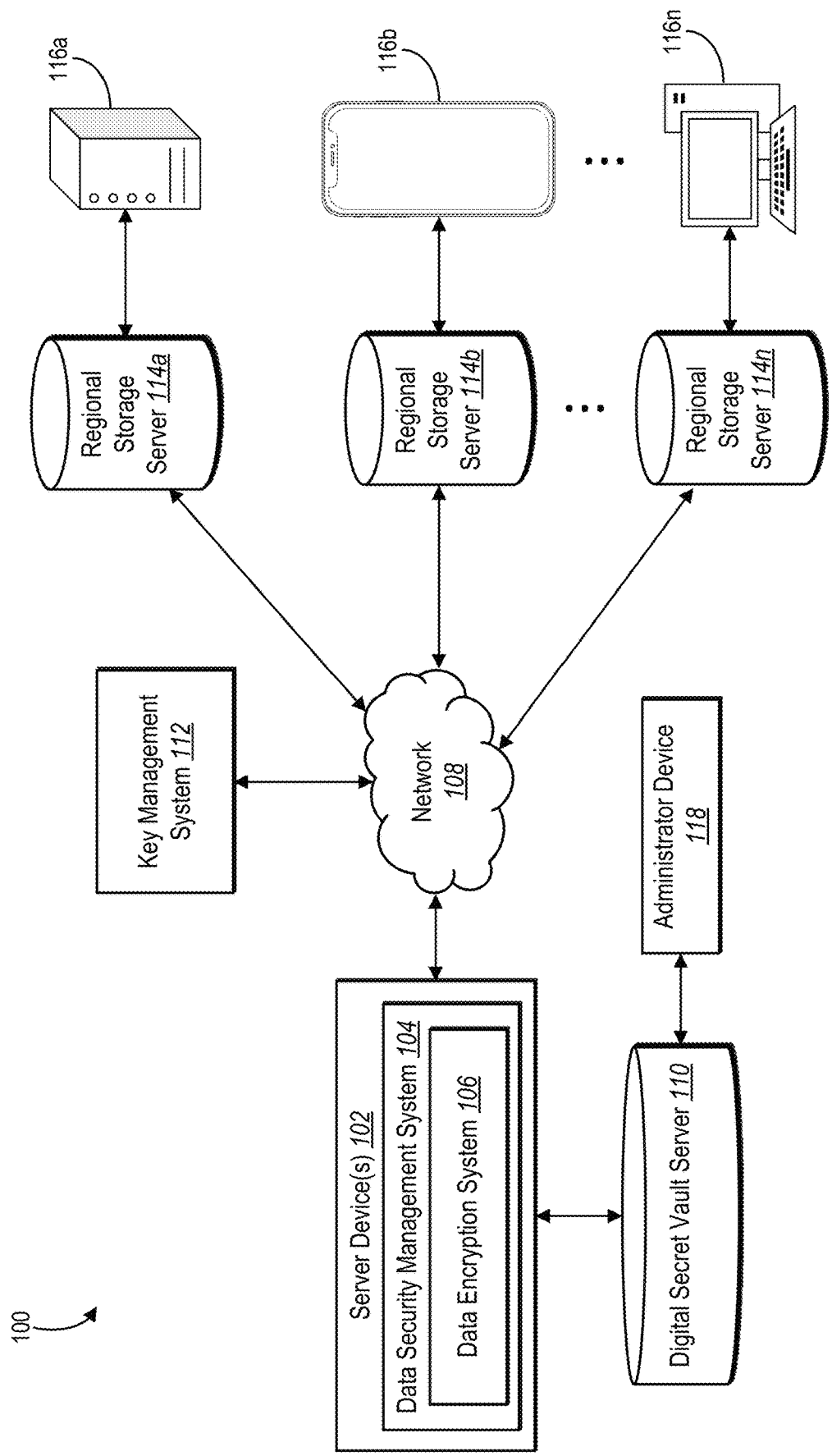
FIG. 1 illustrates a schematic diagram of an example system in which a data encryption system operates in accordance with one or more implementations.

The disclosure describes one or more embodiments of a data encryption system that creates a secured, versioned, and resilient multi-region caching of digital secrets and application credentials. For instance, the data encryption system utilizes an envelope key to encrypt a digital secret. Furthermore, in one or more embodiments, the data encryption system encrypts the envelope key utilizing a management key hosted by a key management system. Subsequently, the data encryption system generates an encrypted data package that includes the encrypted digital secret and the encrypted envelope key. In some instances, the data encryption system stores the encrypted data package on a regional storage server to facilitate access to the encrypted digital data package from one or more regional servers (or application services communicating with the regional storage servers).

As just mentioned, in some embodiments, the data encryption system provides the encrypted data package to at least one regional storage server. In certain instances, the data encryption system provides encrypted data packages that include an encrypted digital secret and (the same or varying) encrypted envelope keys to multiple regional storage servers. Indeed, in one or more implementations, the data encryption system facilitates closer access to the encrypted data packages with reduced latency for regional computing devices while maintaining the security of the encrypted data packages. In addition, by providing the encrypted data packages to regional storage servers, the data encryption system also improves resiliency (e.g., by decreasing dependency on a central data storage server that may experience bottlenecks and/or downtime).

In order to access the encrypted data package, regional computing devices (or application services) can obtain the encrypted envelope key from the regional storage servers and then provide the encrypted envelope key to a key management system to obtain a decrypted envelope key. Furthermore, in one or more embodiments, the key management system utilizes the management key to provide (or return) an encrypted version of the envelope key to a requesting regional computing device. Subsequently, in one or more embodiments, the regional computing device utilizes the decrypted envelope key to decrypt the encrypted digital secret from the encrypted data package.

Additionally, in one or more embodiments, the data encryption system versions and synchronizes encrypted data packages across regional storage servers and/or a digital secret vault server such that the encrypted data packages are immutable across the multi-region storage network. To illustrate, in one or more implementations, the data encryption system utilizes the digital secret to generate an identifier (e.g., a hash-based identifier) for the encrypted digital secret. Moreover, in some embodiments, the data encryption system includes the identifier as part of the encrypted data package and utilizes the identifier to determine whether encrypted digital secrets are similar across multiple encrypted data packages stored on multiple regional storage servers and/or the digital secret vault server.

In some cases, upon determining that a regional storage server is storing an encrypted data package that is not synchronized (e.g., storing an older version of a digital secret), the data encryption system updates the encrypted data package the at the regional storage server. For example, the data encryption system utilizes an envelope key (obtained via the key management system) to encrypt an updated version of a digital secret as an updated encrypted digital secret. Then, in one or more embodiments, the data encryption system generates an updated encrypted data package that includes the updated encrypted digital secret and an encrypted envelope key. Furthermore, in certain instances, the data encryption system then provides the updated encrypted data package to the regional storage server for caching.

As suggested above, many conventional systems are inflexible and inefficient. For instance, conventional systems often utilize encryption management systems to store data securely because many conventional systems fail to securely store data outside of encryption management systems. However, such conventional systems are rigid and unable to easily scale the storage of secured data. To illustrate, conventional systems that utilize encryption management systems to store data are often limited by storage (or encryption) capacities of the encryption management systems. For example, conventional systems often inflexibly limit encryption by a size or have to utilize multiple data segments to encrypt larger digital secret volumes when storing the data on an encryption management system. As such, many conventional systems are unable to flexibly scale secure encryption on encryption management systems to larger digital secrets.

Moreover, conventional systems often inefficiently utilize encryption management systems that result in computing resource bottlenecks. In particular, many conventional systems encrypt and decrypt digital secrets utilizing an encryption management system that handle a high volume of decryption operations. In many instances, such conventional systems experience a processing bottleneck of computing resources at the encryption management system when requesting decryption of a large scale of digital secrets. In addition, due to increased traffic from multiple systems requesting storage, encryption, and/or decryption with an encryption management system, the decryption resources allotted to conventional systems are often throttled by the encryption management system.

Additionally, in order to control the immutability of encrypted data, conventional systems often utilize central storage with an encryption management system to store digital secrets. Indeed, in many cases, conventional systems are unable to accurately synchronize encrypted data and, therefore, centralize the storage with an encryption management system. Oftentimes, these conventional systems suffer from latency issues (e.g., slowed down transfer and response times due to network distances between a computing device accessing the centralized storage).

Furthermore, conventional systems that centralize the storage of digital secrets are often secure but not resilient. In particular, computing devices (or application services) are often unable to access digital secrets and/or other data when the centralized storage servers experience downtime (or network bottlenecks). As such, conventional systems oftentimes are unable to provide both security in data and data resiliency while utilizing centralized storage approaches to keep data secure.

In contrast to many conventional systems, the data encryption system flexibly and efficiently scales secured encryption storage to larger (and more frequently accessed) digital secrets. For example, using the dual approach to securely store management keys for envelope key encryption and decryption on encryption management systems (e.g., a key management system) and utilizing envelope encryption to store the digital secrets in regional storage servers enables flexible encryption and storage of larger digital secrets. By utilizing this dual approach, in one or more implementations, the data encryption system increases the storage capacity of encrypted digital secrets while also maintaining security for the digital secrets.

Moreover, unlike conventional systems that often experience computing bottlenecks and/or throttling, the data encryption system efficiently handles computing bottle neck and throttling issues without compromising data security. For example, by storing encrypted data packages that include encrypted digital secrets and encrypted envelope keys on regional storage servers, the data encryption system increases the number of computer processing points such that storage and decryption operations are handled with fewer bottlenecks.

Additionally, the data encryption system also improves the efficient storage and accessibility of encrypted data. For instance, the data encryption system synchronizes encrypted digital secrets such that the data is secure and immutable across multi-regional storage servers. In one or more embodiments, by versioning and synchronizing the encrypted data, the data encryption system enables efficient access to digital secrets at regional storage servers (instead of a centralized storage of an encryption management system) at reduced latency because the regional storage servers are closer to the regional computing devices accessing those regional storage servers. In addition, by synchronizing the encrypted data packages across the multi-regional storage servers, the data encryption system also improves the resiliency of the digital secrets. For instance, when there is downtime at a central storage server or a regional storage server, access to digital secrets are not impeded at one or more of the other regional storage servers such that the digital secrets are resilient to downtime or inaccessibility of individual storage locations.

Turning now to the figures, FIG. 1 illustrates a schematic diagram of a system 100 (or environment) in which a data encryption system 106 operates in accordance with one or more embodiments. As illustrated in FIG. 1, the system 100 includes server device(s) 102, a digital secret vault server 110, an administrator device 118, a key management system 112, regional storage servers 114*a*-114*n*, regional computing devices 116*a*-116*n*, and a network 108. As further illustrated in FIG. 1, the server device(s) 102, the key management system 112, the regional storage servers 114*a*-114*n*, and the regional computing devices 116a-116n communicate via the network 108. In addition, as shown in FIG. 1, the administrator device 118 and the digital secret vault server 110 communicate with the server device(s) 102. In one or more embodiments, the server device(s) 102 includes, but is not limited to, a computing (or computer) device (as explained below with reference to FIG. 10).

As shown in FIG. 1, the server device(s) 102 include a data security management system 104 which further includes the data encryption system 106. The data security management system 104 (via the data encryption system 106) communicates between the digital secret vault server 110, the key management system 112, and the regional storage servers 114a-114n to create a secured, versioned, and resilient multi-region caching of digital secrets/application credentials. As an example, the data encryption system 106 receives (or retrieves) a digital secret from the digital secret vault server 110.

Then, the data encryption system 106 communicates with the key management system 112 to encrypt the digital secret with an encrypted envelope key. Furthermore, in one or more embodiments, the data encryption system provides an encrypted data package that includes the encrypted digital secret and the encrypted envelope key to one or more of the regional storage servers 114a-114n. For example, the data encryption system 106 includes a set of jobs or operations within an automation server that implements or executes processes in accordance with one or more embodiments herein.

In one or more embodiments, the digital secret vault server includes a combination of computing devices, storage server devices, and/or applications that manage, configure, and/or store digital secrets. For example, the administrator device 118 interacts with the digital secret vault server 110 to store, access, and/or manage digital secrets. In particular, in some embodiments, the administrator device 118 creates or modifies digital secrets within the digital secret vault server via user interfaces and/or application program interfaces (APIs) of the digital secret vault server. Indeed, in certain instances, a digital secret vault server includes a cloud service that interfaces between management and storage of digital secrets. In some cases, one or more computing devices access the digital secret vault server to decrypt and access digital secrets.

As further shown in FIG. 1, the system 100 includes the administrator device 118. In one or more embodiments, the administrator device may include, but is not limited to, a mobile device (e.g., a smartphone, a tablet), a laptop, a desktop, or another type of computing device as described below with reference to FIG. 10. In one or more embodiments, an admin user of the administrator device 118 (e.g., an engineer storing digital secrets) interacts with platforms (e.g., website, application, digital service) to provide or modify digital secrets on the digital secret vault server 110. In addition, in one or more embodiments, the administrator device 118 selects and/or configures encryption and/or storage settings for a digital secret (e.g., encryption type, which key management system to utilize, regional storage assignments) for one or more digital secrets.

As an example, the administrator device 118 deploys an application and/or application data to the digital secret vault server to encrypt and store the application and/or application data as a digital secret. Then, in one or more embodiments, the data encryption system 106 retrieves these digital secrets to encrypt and propagate the digital secrets in encrypted data packages to one or more regional storage servers 114a-114n utilizing the key management system 112. Additionally, in certain instances, the administrator device 118 modifies and/or uploads an updated version of the application and/or application data to the digital secret vault server. In one or more embodiments, the data encryption system 106 synchronizes the updated encrypted data packages from the updated version of the application and/or application data on the digital secret vault server across the regional storage servers 114a-114n.

In addition, as shown in FIG. 1, the system 100 includes the key management system 112. In one or more embodiments, the key management system 112 includes a system implemented (or operated) on one or more computing device (or a cloud service) to manage the encryption and decryption of data. For example, the key management system 112 creates and manages cryptographic keys (e.g., envelope keys, management keys) using a combination of software and hardware security features. In one or more embodiments, the data encryption system 106 utilizes a third-party key management system that receives requests and provides access to manage (or obtain) one or more envelope keys for digital secret encryption through an authenticated account (e.g., using access credentials). Although FIG. 1 illustrates a singular key management system 112, in one or more embodiments, the system 100 includes a plurality of key management systems that correspond to individual regions (e.g., regional key management systems for regional storage servers and regional computing devices) as described below (e.g., in relation to FIG. 2).

In addition, as shown in FIG. 1, the system 100 includes the regional storage servers 114a-114n. In one or more embodiments, the regional storage servers 114a-114n include, but are not limited to, computing (or computer) devices (as explained below with reference to FIG. 10). In some implementations, the regional storage servers 114a-114n are implemented by one or more memory devices (at various geographic locations). Indeed, in one or more embodiments, the regional storage servers 114a-114n maintain data that is accessible by one or more regional computing devices (e.g., regional computing devices 116a-116n). In addition, in one or more embodiments, the regional storage servers 114a-114n include computing devices (or clusters of computing devices) that further perform operations and/or other functions requested by the regional computing devices 116a-116n.

Additionally, as shown in FIG. 1, the system 100 includes the regional computing devices 116a-116n. In some embodiments, the regional computing devices 116a-116n include, but are not limited to, mobile devices (e.g., smartphones, tablets), laptops, desktops, server devices (e.g., application service server devices, cloud service server devices). In one or more embodiments, users of the regional computing devices 116a-116n (or client devices interacting with the regional computing devices 116a-116n) interact with platforms (e.g., website, application, digital service) and/or one or more software applications to access (or modify) data corresponding to one or more digital secrets and/or to operate applications that implement data from the digital secrets. For example, the regional computing devices 116a-116n access an encrypted digital secret from an encrypted data package utilizing a decrypted envelope key from the key management system 112 as described below (e.g., in relation to FIG. 6). The regional computing devices 116a-116n can then utilize the digital secret (e.g., to access a secure database or API, to access a software application hosted or supported by a remote server, or to access a secure account).

In some implementations, the data encryption system 106 can be implemented in whole, or in part, by one or more individual elements of the system 100. Although FIG. 1 illustrates the data encryption system 106 implemented with regard to the server device(s) 102, different components of the data encryption system 106 can be implemented by a variety of devices within the system 100. For example, as mentioned above, the data encryption system 106 is, in some cases, implemented on the digital secret vault server 110.

Additionally, as shown in FIG. 1, the system 100 includes the network 108. As mentioned above, in some embodiments, the network 108 enables communication between components of the system 100. In certain embodiments, the network 108 includes a suitable network and may communicate using any communication platforms and technologies suitable for transporting data and/or communication signals, examples of which are described with reference to FIG. 10. Furthermore, although FIG. 1 illustrates the server device(s) 102 and the regional storage servers 114a-114n communicating via the network 108, in certain embodiments, the various components of the system 100 communicate and/or interact via other methods (e.g., the server device(s) 102 and the regional storage servers 114a-114n communicating directly).

Figure 2:
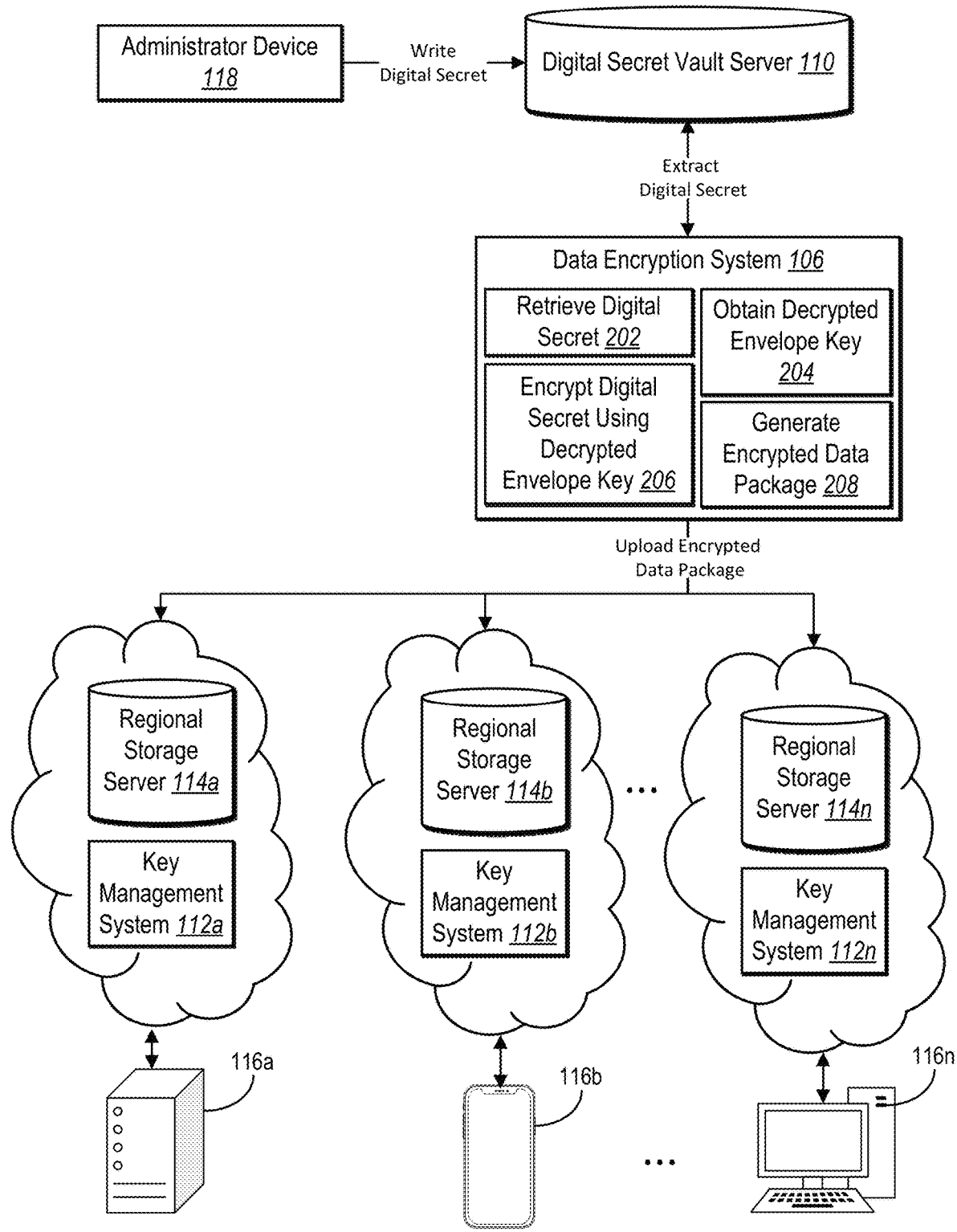
FIG. 2 illustrates a workflow of a data encryption system generating encrypted data packages and synchronizing encrypted data packages across various storage servers in accordance with one or more implementations.

As just mentioned, in one or more embodiments, the data security management system 104 (via the data encryption system 106) communicates between a digital secret vault server, one or more key management systems, and regional storage servers to create a secured, versioned, and resilient multi-region caching of digital secrets and application credentials. FIG. 2 illustrates a workflow of the data encryption system 106 generating encrypted data packages and synchronizing encrypted data packages across various storage servers. Furthermore, FIG. 2 also illustrates a workflow of one or more regional computing devices 116a-116n accessing encrypted data packages (for digital secrets) from regional storage servers.

As shown in FIG. 2, the administrator device 118 stores (or writes) digital secrets to the digital secret vault server 110. In addition, as shown in act 202 of FIG. 2, the data encryption system 106 retrieves (or extracts) a digital secret from the digital secret vault server 110. Then, as shown in the act 204 of FIG. 2, the data encryption system 106 obtains a decrypted envelope key (e.g., from the key management system 112 or the individual regional key management systems 112a-112n). As further shown in act 206 of FIG. 2, the data encryption system 106 encrypts the digital secret using the decrypted envelope key. Furthermore, as shown in act 208 of FIG. 2, the data encryption system 106 generates an encrypted data package (e.g., as a zip file, folder, or other compressed file) from the encrypted digital secret and an encrypted envelope key. Additional detail regarding the data encryption system 106 encrypting and generating an encrypted data package from a digital secret and an envelope key using one or more key management systems is described below (e.g., in relation to FIGS. 3 and 4).

In one or more embodiments, a digital secret includes various forms of private digital data (e.g., text, tokens, strings, electronic documents, digital images). In particular, a digital secret can include passwords, credentials, or digital data utilized to access or provide digital content. For example, a digital secret can include API keys, database credentials, settings, passwords, or other sensitive digital data. As mentioned, in one or more embodiments, a digital secret is encrypted using an encryption algorithm. For example, an encrypted digital secret can be encrypted using an encryption algorithm such as, but not limited to, RSA encryption, DES encryption, Advanced Encryption Standards (AES).

In addition, in one or more embodiments, a key includes a cryptographic key for encrypting or decrypting information. For example, a cryptographic key includes a representation of data that encodes or decodes (e.g., encrypts and/or decrypts) a set of data. For example, a cryptographic key includes a symmetric and/or asymmetric encryption/decryption key (e.g., a private or public key). In some instances, the cryptographic key includes, but is not limited to, an AES key and/or RSA key.

Moreover, in one or more embodiments, an envelope key includes a cryptographic key that is utilized to encode and/or decode data (e.g., encrypt and/or decrypt a digital secret). In particular, in some embodiments, the envelope key includes a cryptographic key that provides access to an encrypted digital secret within a data package. In one or more embodiments, the envelope key is generated by the data encryption system 106 (e.g., prior to encryption) or by the key management system.

Furthermore, in some embodiments, a management key includes a cryptographic key that is managed and/or stored by a key management system (e.g., such that the cryptographic key is inaccessible outside of the key management system). Indeed, in one or more embodiments, the management key includes a cryptographic key that is utilized to encode and/or decode envelope keys (and/or other data) within the key management system. In particular, in one or more embodiments, an envelope key and a management key can include, but are not limited to, an RSA key and/or an AES key.

Additionally, in reference to FIG. 2, in one or more embodiments, the data encryption system 106 stores the generated encrypted data package on one or more of the regional storage servers 114a-114n. For instance, the data encryption system 106 stores an encrypted data package that includes the encrypted digital secret and an encrypted envelope key on the one or more regional storage servers 114a-114n. In some cases, the data encryption system 106 provides different encrypted data packages per regional storage servers 114a-114n that include the encrypted digital secret and differently encrypted envelope keys (and/or different envelope keys that are encrypted) per regional storage servers 114a-114n using a respective regional key management system from the regional key management systems 112a-112n. Additional detail regarding the data encryption system 106 providing encrypted data packages to one or more regional storage servers is described below (e.g., in relation to FIGS. 3 and 4).

Additionally, in one or more embodiments, the data encryption system 106 identifies updates to a digital secret from the digital secret vault server 110 and/or the regional storage servers 114a-114n. Upon identifying an update, the data encryption system 106 synchronizes the updated digital secret (within an encrypted data package) across the regional storage servers 114a-114n. Additional detail regarding the data encryption system 106 identifying updates and synchronizing the one or more regional storage servers 114a-114n is described below (e.g., in relation to FIG. 5).

Moreover, as illustrated in FIG. 2, a regional computing device from the regional computing devices 116a-116n accesses a regional storage server from the regional storage servers 114a-114n to retrieve an encrypted data package. Then, as shown in FIG. 2, the regional computing devices 114a-114n communicate with regional key management systems 112a-112n (e.g., a regional key management system associated with a particular regional storage server as part of a cloud service) to obtain a decrypted envelope key for the encrypted data package. In addition, in some instances, the regional computing devices then utilize the decrypted envelope keys from the regional key management systems 112a-112n to decrypt and access a digital secret corresponding to the encrypted data packages from a respective regional storage server from the regional storage servers 114a-114n. Additional detail regarding a regional computing device accessing a digital secret from an encrypted data package of a regional storage server is described below (e.g., in relation to FIG. 6).

Indeed, FIG. 2 illustrates the regional computing devices utilizing separate regional key management systems that are associated with regional storage servers per region. In some cases, a region includes a regional key management system and a regional storage server such that data encrypted in the region is capable of being decrypted using the regional key management system of the same region (e.g., not using another region). Furthermore, as shown in FIG. 2, the data encryption system 106 communicates encrypts and generates encrypted data packages from a digital secret and envelope keys for different regions using regional key management systems 112a-112n.

Although FIG. 2 illustrates a separate regional key management system per region, in one or more embodiments, it will be appreciated that the data encryption system 106 and the regional computing devices communicate with a singular key management system 112 (as shown in FIG. 1) or another combination of key management systems (e.g., a single key management system for every two regions) to obtain a decrypted envelope key for the encrypted data package. In some instances, the singular key management system 112 utilizes different management keys to decrypt envelope keys for different regional storage servers and/or the same management key to decrypt envelope keys for different regional storage servers.

For simplicity, it will be appreciated that FIGS. 3-6 illustrate and describe the data encryption system 106 and the regional computing devices utilizing the key management system 112 (e.g., as a singular key management system) to obtain an encrypted and/or decrypted envelope key for encrypted data packages from one or more regional storage servers. However, although one or more embodiments of FIG. 3-6 illustrate the data encryption system 106 communicating with the key management system 112, the data encryption system 106, in one or more embodiments, encrypts and generates encrypted data packages from a digital secret and envelope keys using regional key management systems 112a-112n as shown in FIG. 2. Likewise, although one or more embodiments of FIG. 3-6 illustrate one or more regional computing devices communicating with the key management system 112, in some instances, the one or more regional computing devices communicate with a regional key management system from the regional key management systems 112a-112n to decrypt encrypted data packages from a respective regional storage server 114a-114n.

Figure 3:
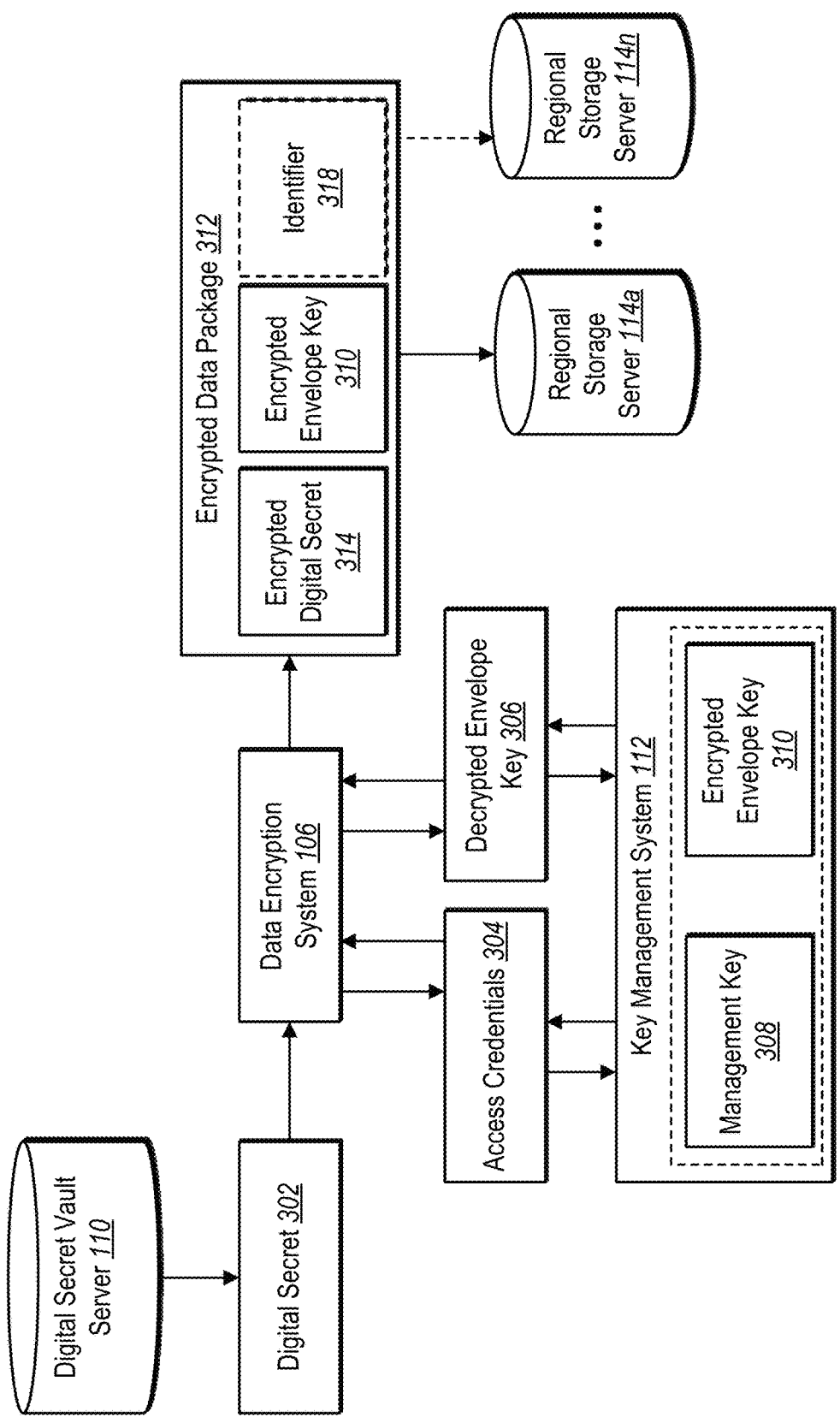
FIG. 3 illustrates a data encryption system utilizing a digital secret from a digital secret vault server and an encrypted envelope key from a key management system to generate an encrypted data package in accordance with one or more implementations.

As mentioned above, the data encryption system 106 generates encrypted data packages from digital secrets and envelope keys for storage at one or more regional storage servers. FIG. 3 illustrates the data encryption system 106 utilizing a digital secret from a digital secret vault server and an encrypted envelope key from a key management system to generate an encrypted data package (i.e., without accessing the management key from the key management system). Furthermore, FIG. 3 also illustrates the data encryption system 106 providing the encrypted data package to one or more regional storage servers for storage.

As shown in FIG. 3, the data encryption system 106 retrieves (or identifies) a digital secret 302 from the digital secret vault server 110. Then, as further shown in FIG. 3, the data encryption system 106 utilizes access credentials 304 (e.g., passwords or tokens) to access the key management system 112. With the access credentials 304, the data encryption system 106 retrieves a decrypted envelope key 306 from the key management system. Indeed, in one or more embodiments, the decrypted envelope key 306 is decrypted by the key management system utilizing a management key 308 with an encrypted envelope key 310.

Upon receiving the decrypted envelope key 306, in reference to FIG. 3, the data encryption system 106 utilizes the decrypted envelope key 306 with the digital secret 302 to generate an encrypted digital secret 314. Furthermore, as shown in FIG. 3, the data encryption system 106 then generates an encrypted data package 312 which includes the encrypted digital secret 314 and the encrypted envelope key 310. In addition, as illustrated in FIG. 3, the data encryption system 106 also generates an identifier 318 for the encrypted data package 312. As further shown in FIG. 3, the data encryption system 106 provides the encrypted data package 312 to one or more of the regional storage servers 114a-114n.

In one or more embodiments, the data encryption system 106 requests and receives an envelope key from the key management system. In certain instances, the data encryption system 106 authenticates its identity with the key management system 112 to access envelope keys corresponding to the data encryption system 106 (or the digital secret vault server 110). For example, to access the key management system 112 and request the key management system to decrypt an envelope key (using a management key), the data encryption system 106 provides access credentials that authenticate the data encryption system 106 with the key management system 112. To illustrate, in one or more embodiments, the data encryption system 106 utilizes, but is not limited to, password-based, code-based, certificate-based, biometric-based, and/or token-based access credentials to authenticate with the key management system 112.

Upon authenticating with the key management system 112, the data encryption system 106 communicates requests to retrieve one or more envelope keys. Indeed, in one or more embodiments, the data encryption system 106 causes the key management system 112 to retrieve an encrypted envelope key and a corresponding management key. Then, in some implementations, the key management system 112 decrypts the encrypted envelope key utilizing the management key. In some embodiments, the data encryption system 106 transmits a request to a key management system to decrypt and provide an envelope key without accessing or viewing the corresponding management key for the decryption process. In certain instances, the data encryption system 106 (or other systems) are unable to access the encrypted envelope keys without a corresponding management key from the key management system 112.

In one or more embodiments, the data encryption system 106 utilizes the decrypted envelope key to encrypt a digital secret. In particular, in one or more implementations, the data encryption system 106 converts a representation of information of the digital secret to a form of encrypted information (e.g., a form of ciphertext) utilizing an encryption algorithm in association with the envelope key. In addition, in one or more embodiments, the data encryption system 106 encrypts the digital secret such that the encrypted digital secret is decipherable (e.g., decrypted) using the envelope key.

In some instances, the data encryption system 106 generates an identifier for the encrypted data package (or encrypted digital secret). In one or more embodiments, the data encryption system 106 determines an identifier that is unique to the content of the digital secret such that the identifier is utilized to detect changes within versions of the digital secret. For example, the data encryption system 106 generates a hash value from the content of the digital secret and utilizes the hash value as part of an identifier for the digital secret. In some embodiments, the data encryption system 106 includes the hash value with a title (or name) of the digital secret as an identifier for the encrypted data package (or the encrypted digital secret). In one or more embodiments, the data encryption system 106 utilizes the identifier associated with the encrypted data package to version and synchronize encrypted data packages across multiple regional storage servers as described in greater detail below (e.g., in relation to FIG. 5). Indeed, in one or more embodiments, the data encryption system 106 generates an identifier utilizing hash functions such as, but not limited to, a Message Digest algorithm (e.g., MD5) and/or a Secure Hash Algorithm (e.g., SHA-2, SHA-256).

Although one or more embodiments illustrate the data encryption system 106 generating a hash value as an identifier for a digital secret, the data encryption system 106, in some embodiments, generates hash values from encrypted digital secrets. For instance, the data encryption system 106 utilizes information of an encrypted digital secret to generate a hash value. Then, in some cases, the data encryption system 106 utilizes the hash value from the encrypted digital secret as the identifier for the encrypted digital secret.

In certain instances, the data encryption system 106 also transmits a request to a key management system to rotate envelope keys for encrypted data packages. In particular, in one or more embodiments, the data encryption system 106 causes the key management system to generate a new envelope key for an encrypted data package without changing the content of the encrypted digital secret within the encrypted data package. Indeed, in certain instances, the data encryption system 106 causes the key management system to generate the new envelope key to encrypt and decrypt the same encrypted digital secret. Indeed, in one or more embodiments, the data encryption system 106 causes the key management system to rotate an envelope key by modifying or changing the key material (e.g., cryptographic material that controls the encryption and decryption of content). In some cases, the data encryption system 106 causes the key management system to rotate an envelope key by modifying the key material while maintaining an identifier of the envelope key.

In some embodiments, the data encryption system 106 also transmits a request to a key management system to rotate a management key. In particular, in one or more embodiments, the data encryption system 106 causes the key management system to rotate a management key corresponding to an envelope key by generating a new management key (or modifying the management key) as described above. In one or more embodiments, the key management system automatically rotates an envelope key (or a management key) based on a configured setting or admin preference (e.g., every 6-months, every year, every update to a digital secret, or every fifth update to a digital secret).

In some embodiments, the data encryption system 106 generates an encrypted data package for an image template that includes software components (e.g., operating systems, applications, and/or virtual machine instances). In particular, in some embodiments, the data encryption system 106 encrypts a software-loading image template utilizing an envelope key (as described above). Moreover, in one or more embodiments, the data encryption system 106 provides the encrypted software-loading image template (e.g., as the encrypted digital secret) and an encrypted envelope key as an encrypted data package to one or more regional storage servers.

Figure 4:
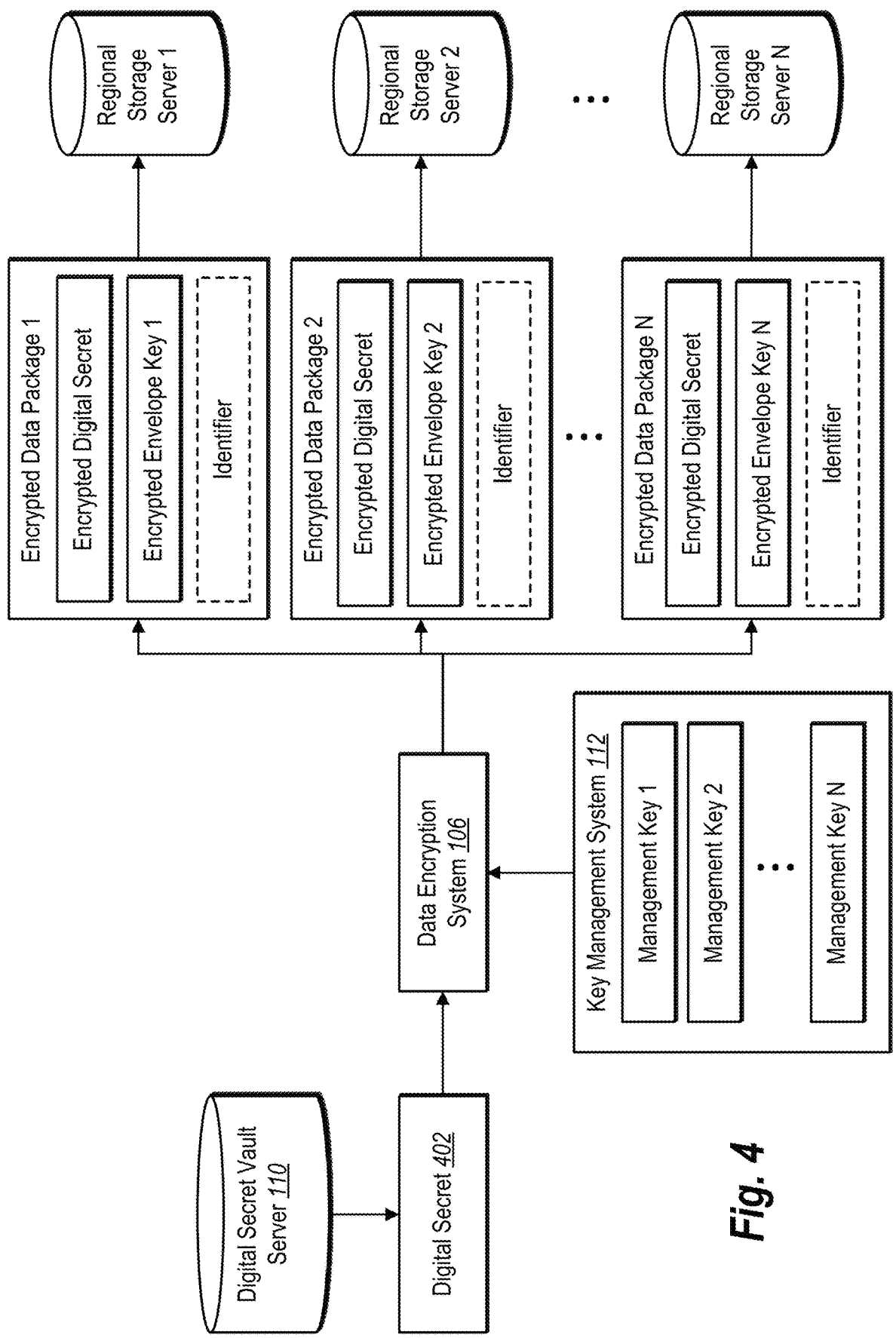
FIG. 4 illustrates a data encryption system providing encrypted data packages to multiple regional storage servers in accordance with one or more implementations.

As mentioned above, the data encryption system 106, in some embodiments, provides encrypted data packages to multiple regional storage servers. For example, FIG. 4 illustrates the data encryption system 106 retrieving a digital secret 402 from the digital secret vault server 110. Then, in reference to FIG. 4, the data encryption system 106 encrypts the digital secret utilizing various envelope keys that correspond to management keys (e.g., management key 1 through management key N) from the key management system 112.

Furthermore, in one or more embodiments, as shown in FIG. 4, the data encryption system 106 utilizes envelope keys to encrypt the digital secret 402 and generate the encrypted data packages 1-N. As shown in FIG. 4, the data encryption system 106 generates encrypted data packages 1-N that each includes the encrypted digital secret and a corresponding encrypted envelope key 1-N. Moreover, as illustrated in FIG. 4, the data encryption system 106 also generates an identifier for each of the encrypted data packages 1-N. Indeed, as further shown in FIG. 4, the data encryption system 106 provides the encrypted data packages 1-N to a corresponding regional storage server 1-N.

In one or more embodiments, the data encryption system 106 utilizes the same envelope key to encrypt a digital secret while generating an encrypted data package to provide to multiple regional storage servers. In particular, in some embodiments, the data encryption system 106 utilizes the same envelope key for a digital secret and causes the encryption of the envelope key on the key management system to be different for each regional storage server. As an example, the data encryption system 106 encrypts a digital secret utilizing an envelope key for a first regional storage server and causes encryption of the envelope key via a first management key on the key management system. Additionally, in some embodiments, the data encryption system 106 encrypts the digital secret utilizing the envelope key for a second regional storage server and causes encryption of the envelope key via a second management key on the key management system. Indeed, in one or more embodiments, the particular management key is utilized by the key management system to decrypt and send the envelope key associated with the encrypted data package for a particular regional storage server.

In some embodiments, the data encryption system 106 utilizes a different envelope key per regional storage server. For example, the data encryption system 106 encrypts a digital secret utilizing a first envelope key for a first regional storage server and causes the encryption of the first envelope key utilizing a first management key on the key management system. Additionally, in some embodiments, the data encryption system 106 encrypts the digital secret utilizing a second envelope key for a second regional storage server and causes the encryption of the second envelope key utilizing a second management key on the key management system.

Additionally, as described above, in one or more embodiments, the data encryption system 106 requests (or causes) the key management system to rotate one or more of the envelope keys associated with encrypted data packages. In addition, in some embodiments, the data encryption system 106 generates various numbers of encrypted data packages for various numbers of regional storage servers. Furthermore, in one or more embodiments, the data encryption system 106 generates encrypted data packages for various numbers of digital secrets. Moreover, in one or more embodiments, the data encryption system 106 generates one or more encrypted data packages utilizing the various approaches described above to store on the digital secret vault server 110.

Figure 5:
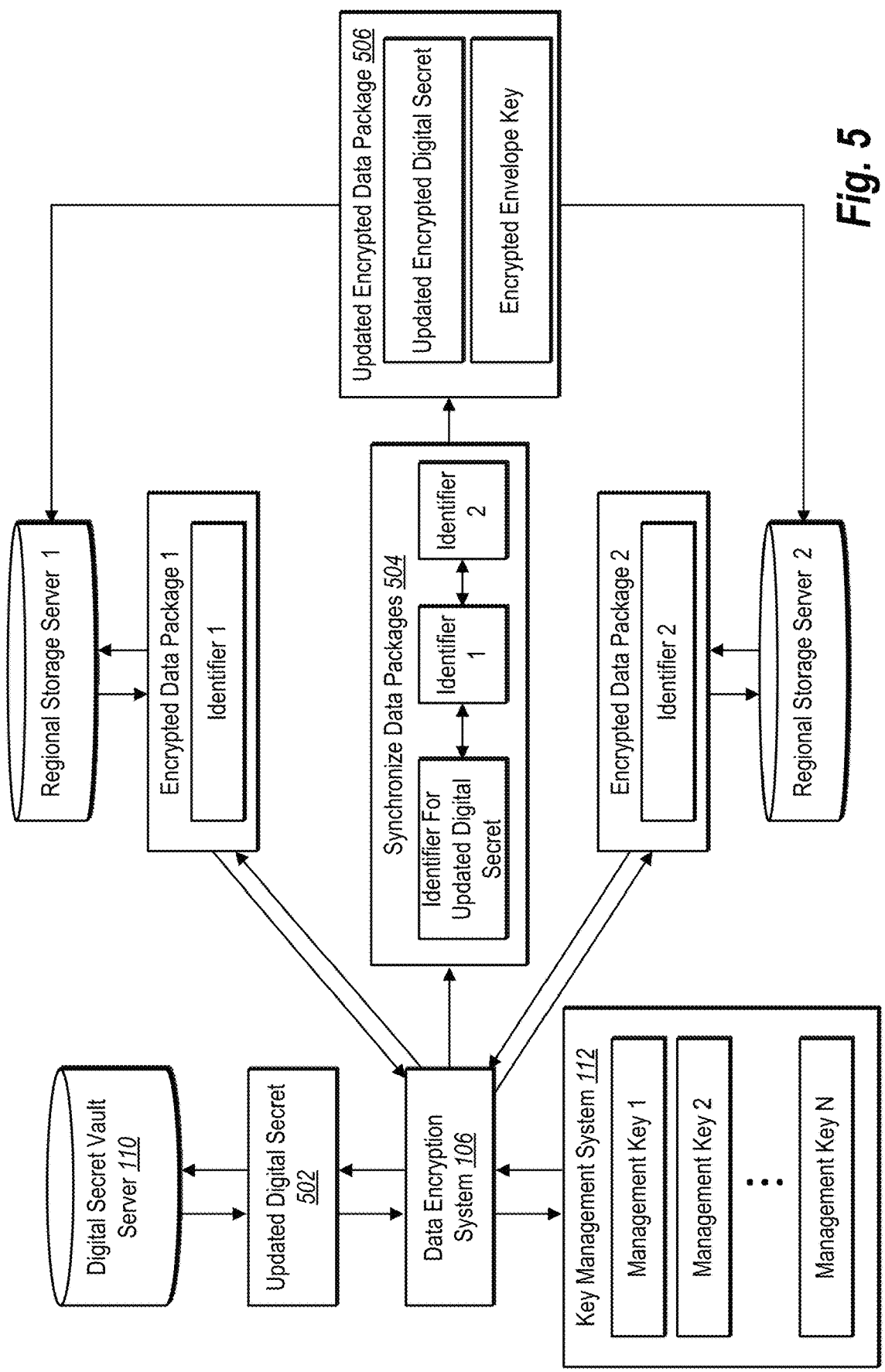
FIG. 5 illustrates a data encryption system synchronizing versions of a digital secret across regional storage servers in accordance with one or more implementations.

As mentioned above, the data encryption system 106 also versions and synchronizes encrypted data packages across regional storage servers and/or a digital secret vault server. For example, FIG. 5 illustrates the data encryption system 106 synchronizing versions of the digital secret across regional storage servers. As shown in FIG. 5, the data encryption system 106 receives an updated digital secret 502 from the digital secret vault server 110. Additionally, as shown in FIG. 5, the data encryption system 106 accesses an encrypted data package 1 from a regional storage server 1 which corresponds to an identifier 1 and an encrypted data package 2 from a regional storage server 2 which corresponds to an identifier 2.

As further shown in FIG. 5, the data encryption system 106 compares the identifier 1, the identifier 2, and the identifier for the updated digital secret (e.g., generated as described above) within an act 504 to synchronize the data packages. In particular, in one or more embodiments, the data encryption system 106 compares the identifier for the updated digital secret, the identifier 1, and the identifier 2 to determine whether the encrypted digital secrets corresponding to the encrypted data packages and the digital secret vault server 110 are similar or different. For instance, in reference to FIG. 5, the data encryption system 106 compares the identifier for the updated digital secret, the identifier 1, and the identifier 2 to determine differences (or similarities) between the identifiers.

In further reference to FIG. 5, upon identifying that the identifier for the updated digital secret is different from the identifier 1 and the identifier 2, the data encryption system 106 determines that the encrypted data package 1 (having a first encrypted version of a digital secret) and the encrypted data package 2 (having a second encrypted version of a digital secret) are not synchronized with the updated digital secret 502 from the digital secret vault server 110. Subsequently, as shown in FIG. 5, the data encryption system 106 generates an updated encrypted data package 506 that includes an updated encrypted digital secret (e.g., from the updated digital secret 502) and an encrypted envelope key (e.g., from an envelope key utilized to encrypt the updated digital secret 502). Furthermore, as shown in FIG. 5, the data encryption system 106 provides the updated encrypted data package 506 to the regional storage server 1 and the regional storage server 2.

In particular, in some cases, the data encryption system 106 compares the identifiers to determine equality between two or more identifiers. To illustrate, in some embodiments, the data encryption system 106 compares identifiers by comparing hash values (e.g., to determine integrity) within the identifiers. For example, the data encryption system 106 utilizes a hash value comparison function such as, but not limited to, a checksum function (e.g., an SHA checksum), comparing hash bytes in an array, and/or a comparison of the string values of the hash for equality. Upon determining that two or more hash values of identifiers are not the same (or altered), the data encryption system 106, in one or more embodiments, determines that the underlying encrypted digital secrets are changed. In some cases, the data encryption system 106 further utilizes time stamps (e.g., modification date and time, creation date and time) and/or version labels (e.g., "v1," "v2") within the identifier to further determine which digital secret is the most current (for synchronization). As an example, the data encryption system 106 generates an identifier for an encrypted data package that includes a hash value, a version indicator, and a name (e.g., "secrets-v1-a2f4d1s.gzip," "secrets-v2-a34f3d1s.gzip," "secrets-v2-a35tf1g.gzip").

In some instances, the data encryption system 106 updates the regional storage servers identified as out of sync (e.g., one or more regional storage servers having an encrypted data package that does not match other encrypted data packages for the same digital secret). In one or more embodiments, the data encryption system 106 replaces (or propagates) the updated encrypted data package to each regional storage server to synchronize the regional storage servers.

In some cases, the data encryption system 106 determines that two or more identifiers corresponding to encrypted data packages are the same (or equal in terms of hash values). In one or more embodiments, the data encryption system 106 identifies the two or more encrypted data packages having the two or more matching identifiers as synchronized. Indeed, upon determining that the two or more encrypted data packages are synchronized, the data encryption system 106 does not update the two or more encrypted data packages.

Furthermore, in one or more embodiments, the data encryption system 106 causes a key management system to rotate one or more envelope keys when synchronizing one or more encrypted data packages. In particular, the data encryption system 106 causes a key management system to rotate one or more envelope keys while synchronizing one or more encrypted data packages. Indeed, in some embodiments, the data encryption system 106 causes the key management system to rotate the envelope keys at each synchronization of one or more encrypted data packages.

Figure 6:
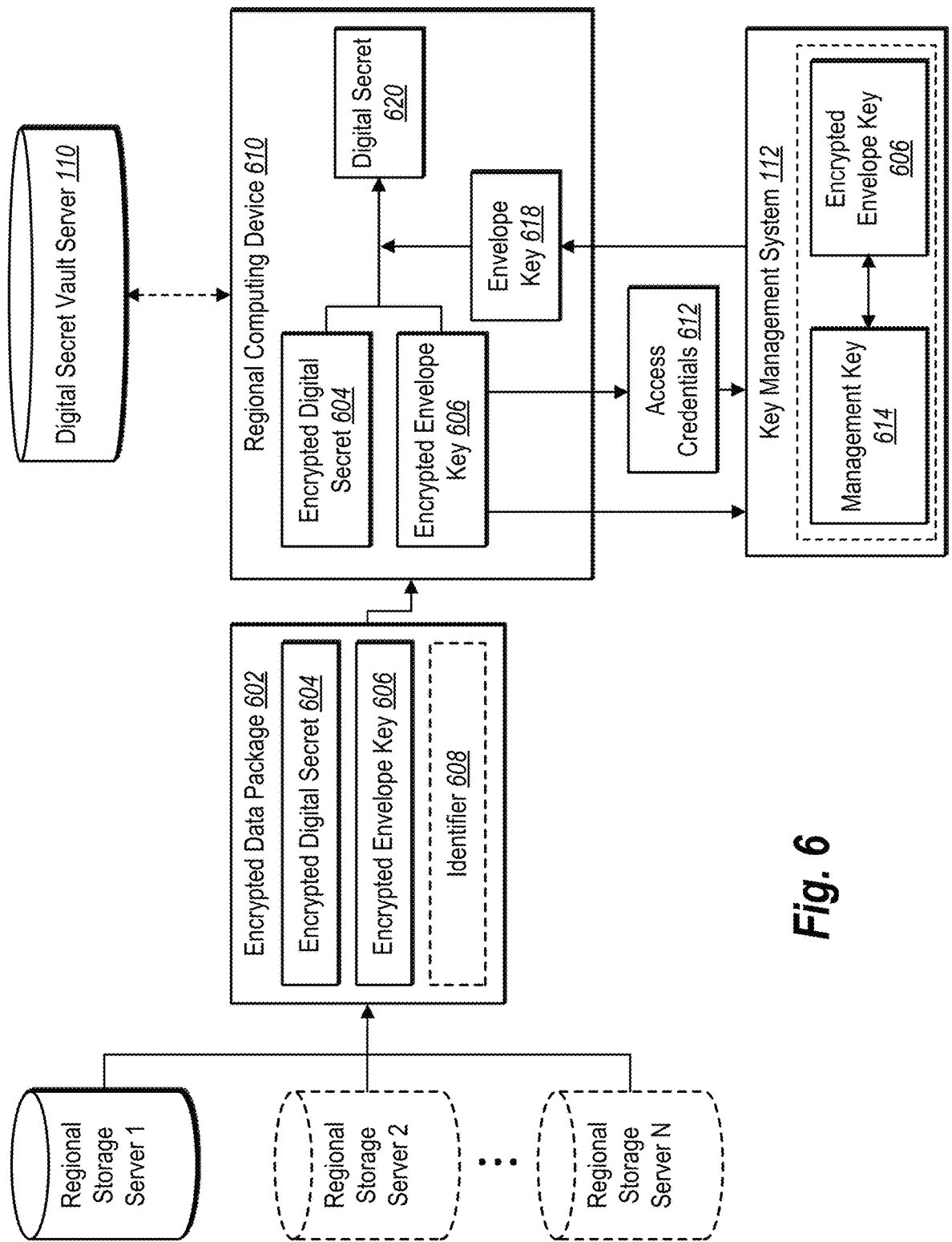
FIG. 6 illustrates a regional computing device accessing an encrypted data package and decrypting a digital secret from an encrypted data package utilizing a key management system in accordance with one or more implementations.

As mentioned above, in one or more embodiments, a regional computing device accesses an encrypted data package and decrypts a digital secret from the encrypted data package utilizing a key management system. For example, FIG. 6 illustrates a regional computing device accessing an encrypted data package. In particular, FIG. 6 illustrates a regional computing device decrypting content of an encrypted data package by interacting with a regional storage server and a key management system (e.g., without accessing management keys of the key management system).

For example, as illustrated in FIG. 6, a regional computing device 610 retrieves an encrypted data package 602 from a regional storage server 1. As shown in FIG. 6, the retrieved encrypted data package 602 includes an encrypted digital secret 604 and an encrypted envelope key 606. In some cases, as shown in FIG. 6, the encrypted data package 602 also includes the identifier 608.

Then, as shown in FIG. 6, the regional computing device 610 provides the encrypted envelope key 606 to the key management system 112. As further illustrated in FIG. 6, the regional computing device 610 also transmits access credentials 612 to the key management system 112. Upon transmission of the encrypted envelope key 606 and the access credentials 612 to the key management system 112, the regional computing device 610 requests a decryption of the encrypted envelope key 606 from the key management system 112. As shown in FIG. 6, the key management system 112 utilizes a management key 614 to decipher the encrypted envelope key 606 and provides the regional computing device 610 with an envelope key 618. Additionally, as shown in FIG. 6, the regional computing device 610 utilizes the decrypted envelope key 618 to decrypt the encrypted digital secret 604 to access a decrypted digital secret 620. In one or more embodiments, the key management system 112 (as illustrated in FIG. 6) includes a key management system that is implemented for a particular regional storage server (e.g., a separate regional key management system 112*a*-112*n* as described in FIG. 2) and/or a singular key management system that stores multiple management keys for various numbers of regional storage servers.

In some embodiments, a regional computing device is region bound when accessing an encrypted data package. For example, the regional computing device receives a particular encrypted envelope key for an encrypted data package from the regional storage server corresponding to the region of the regional computing device (e.g., based on geographic location, based on assignment). Additionally, in certain instances, the regional computing device receives (or obtains) access credentials that work to decrypt the particular encrypted envelope key upon communication with the key management system 112. Indeed, in one or more embodiments, the data encryption system 106 provides a different encrypted envelope key (or different envelope key and management key association) to each independent regional storage server.

In certain instances, the regional computing device 610 communicates with the digital secret vault server 110 (e.g., in relation to FIG. 6) to access a digital secret. In particular, in one or more embodiments, the regional computing device 610 accesses an encrypted data package from the digital secret vault server 110 and further communicates with the key management system 112 to decrypt a digital secret within the encrypted data package. In some embodiments (e.g., in relation to FIG. 6), the regional computing device 610 accesses the digital secret vault server 110 when the regional storage server 1 is inaccessible (e.g., due to network issues, downtime, the server being nonresponsive) for data resiliency.

Furthermore, in some embodiments (e.g., in relation to FIG. 6), the regional computing device communicates with another regional storage server (e.g., regional storage server N) to access an encrypted data package. In particular, in some embodiments, the regional computing device receives an additional encrypted data package from an additional regional storage server. Then, in one or more embodiments, the regional computing device communicates with the key management system to decrypt an additional envelope key from the additional encrypted data package to utilize the decrypted additional envelope key to decipher an additional encrypted digital secret from the additional encrypted data package. In certain instances, the additional encrypted data package includes a digital secret that is the same (or similar to) a digital secret corresponding to an encrypted data package from the regional storage server that corresponds to the regional computing device.

In some embodiments, the data encryption system 106 stores encrypted data packages with different envelope key encryptions (or different envelope keys) as described above. Indeed, in one or more embodiments, a regional computing device obtains the encrypted data package from an additional regional storage server from a different region (e.g., upon providing applicable access credentials).

Subsequently, in one or more embodiments, the regional computing device decrypts an additional envelope key (from the encrypted data package of the additional regional storage server) via the key management system (as described above).

Although one or more embodiments illustrate the data encryption system 106 handling a single digital secret, the data encryption system 106, in one or more embodiments, generates multiple encrypted data packages for various numbers of digital secrets. In addition, in one or more embodiments, the data encryption system 106 stores one or more encrypted data packages on various numbers of regional storage servers. In addition, although a single key management system is illustrated in one or more embodiments, the data encryption system 106, in some cases, utilizes various numbers of key management systems to store encrypted envelope keys and to decrypt envelope keys utilizing management keys. For example, in some embodiments, the data encryption system 106 utilizes AWS Key Management Service (KMS) and/or Azure KeyVault.

Figure 7:
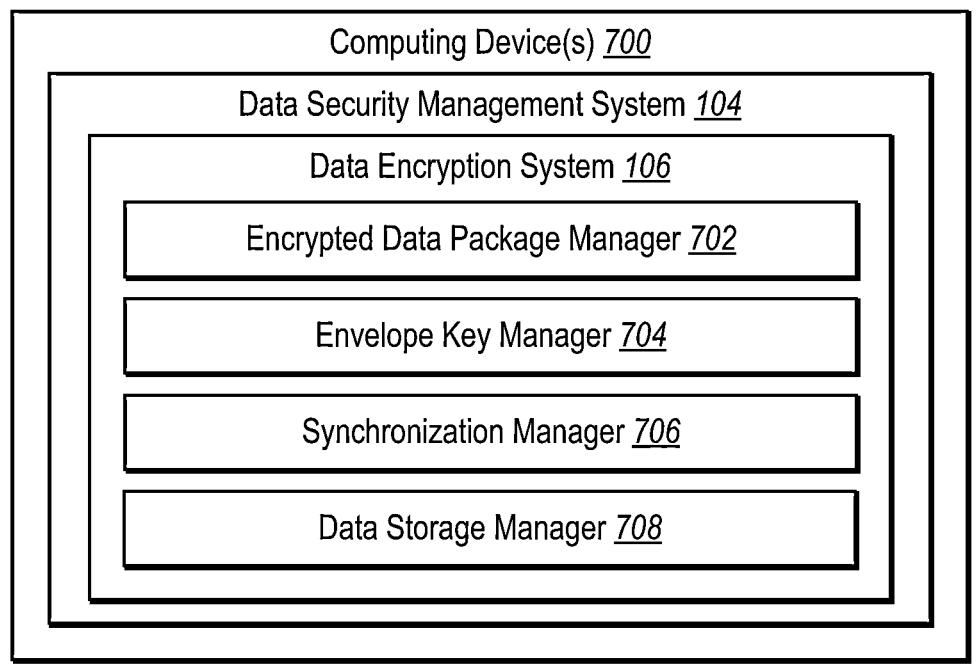
FIG. 7 illustrates a schematic diagram of a data encryption system in accordance with one or more implementations.

Turning now to FIG. 7, additional detail will be provided regarding components and capabilities of one or more implementations of the data encryption system. In particular, FIG. 7 illustrates an example data encryption system executed by a computing device(s) 700 (e.g., server device(s) 102 and/or the digital secret vault server 110). As shown by the implementation of FIG. 7, the computing device(s) 700 includes or hosts the data security management system 104 and the data encryption system 106. Furthermore, as shown in FIG. 7, the data encryption system 106 includes an encrypted data package manager 702, an envelope key manager 704, a synchronization manager 706, and a data storage manager 708.

As just mentioned, and as illustrated in the implementation of FIG. 7, the data encryption system 106 includes the encrypted data package manager 702. For example, the encrypted data package manager 702 receives one or more digital secrets and utilizes an envelope key to encrypt the digital secret as described above (e.g., in relation to FIGS. 2-4). In addition, in some embodiments, the encrypted data package manager 702 also utilizes an encrypted envelope key, the encrypted digital secret, and an identifier to generate an encrypted data package as described above (e.g., in relation to FIGS. 2-4).

Additionally, as shown in FIG. 7, the data encryption system 106 includes the envelope key manager 704. For instance, the envelope key manager 704 communicates with a key management system to retrieve a decrypted envelope key from a key management system as described above (e.g., in relation to FIGS. 2-4). In particular, in one or more embodiments, the envelope key manager 704 requests an envelope key from a key management system and causes the key management system to utilize a management key to decode an encrypted envelope key for transmission as described above (e.g., in relation to FIGS. 2-4).

Moreover, as shown in FIG. 7, the data encryption system 106 includes the synchronization manager 706. For example, the synchronization manager 706 utilizes identifiers from encrypted data packages to compare encrypted data packages on a digital secret vault server and/or one or more regional storage servers as described above (e.g., in relation to FIG. 5). In particular, upon determining that one or more encrypted data packages of one or more regional storage servers are not synchronized, the synchronization manager 706 generates an updated encrypted data package that includes an updated encrypted digital secret and an encrypted envelope key to provide to the unsynchronized regional storage servers as described above (e.g., in relation to FIG. 5).

In addition, as shown in FIG. 7, the data encryption system 106 includes the data storage manager 708. In one or more implementations, the data storage manager 708 is implemented by one or more memory devices. Additionally, in some implementations, the data storage manager 708 maintains data to perform one or more functions of the data encryption system 106. For example, the data storage manager 708 includes encrypted envelope keys, access credentials, digital secrets, and/or identifiers for encrypted data packages.

Although not shown in FIG. 7, in one or more embodiments an additional computing device (e.g., a regional computing device) includes an encrypted data package manager, an envelope key manager, and a data storage manager. In particular, in one or more embodiments, the encrypted data package manager of the additional computing device accesses an encrypted data package from a regional storage server and decrypts a digital secret from the encrypted data package utilizing a decrypted envelope key from a key management system as described above (e.g., in relation to FIG. 6). Furthermore, in some embodiments, the envelope key manager of the additional computing device communicates with a key management system (utilizing access credentials) to request decryption of encrypted envelope keys as described above (e.g., in relation to FIG. 6).

Each of the components 702-708 of the computing device 700 (e.g., the server device(s) 102 implementing the data encryption system 106), as shown in FIG. 7, may be in communication with one another using any suitable communication technologies. It will be recognized that although components 702-708 of the computing device 700 (or computer device) are shown to be separate in FIG. 7, any of components 702-708 may be combined into fewer components, such as into a single facility or module, divided into more components, or configured into different components as may serve a particular embodiment.

The components 702-708 of the computing device 700 can comprise software, hardware, or both. For example, the components 702-708 can comprise one or more instructions stored on a computer-readable storage medium and executable by processor of one or more computing devices. When executed by the one or more processors, the computer-executable instructions of the data encryption system 106 (e.g., via the computing device 700) can cause a client device and/or server device to perform the methods described herein. Alternatively, the components 702-708 can comprise a combination of computer-executable instructions and hardware.

Furthermore, the components 702-708 of the data encryption system 106 may, for example, be implemented as one or more operating systems, as one or more stand-alone applications, as one or more modules of an application, as one or more plug-ins, as one or more library functions or functions that may be called by other applications, and/or as a cloud-computing model. Thus, the components 702-708 may be implemented as a stand-alone application, such as a desktop or mobile application. Furthermore, the components 702-708 may be implemented as one or more web-based applications hosted on a remote server. The components 702-708 may also be implemented in a suite of mobile device applications or "apps." To illustrate, the components 702-708 may be implemented in an application, including but not limited to, ADOBE CREATIVE CLOUD, ADOBE EXPRIENCE CLOUD, and ADOBE ANALYTICS CLOUD. The foregoing are either registered trademarks or trademarks of Adobe Inc. in the United States and/or other countries.

Figure 8:
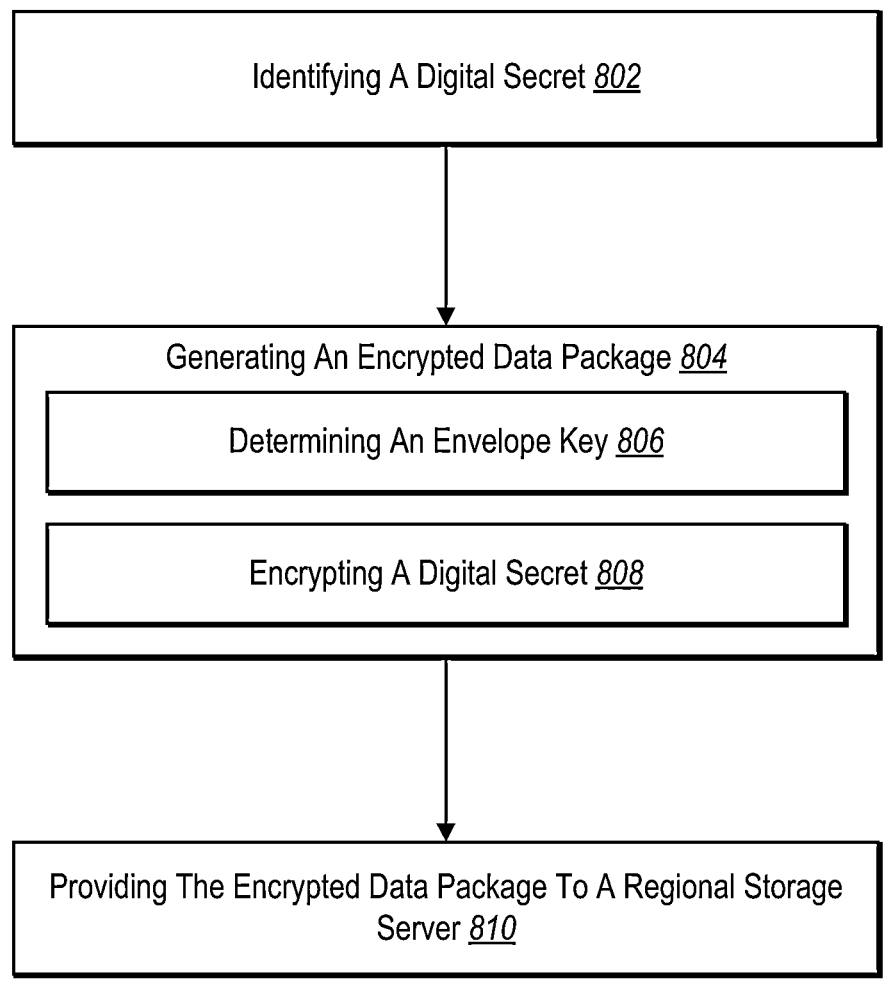
FIG. 8 illustrates a flowchart of a series of acts for generating encrypted data packages in accordance with one or more implementations.
Figure 9:
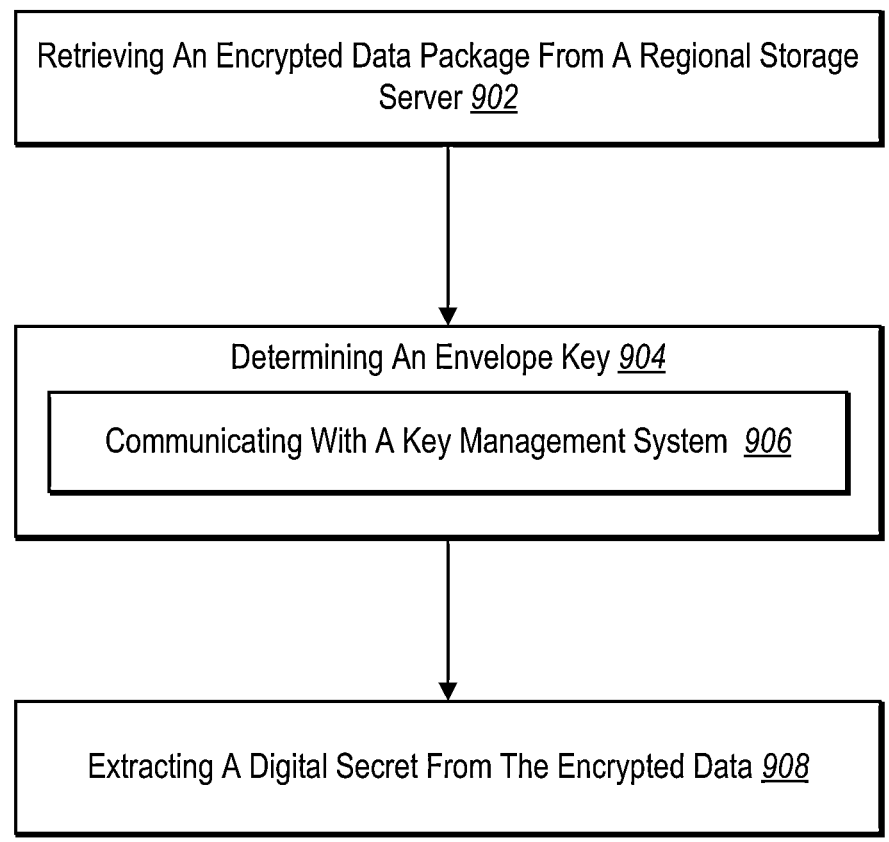
FIG. 9 illustrates a flowchart of a series of acts for accessing a digital secret from an encrypted data package in accordance with one or more implementations.

FIGS. 1-7, the corresponding text, and the examples provide a number of different methods, systems, devices, and non-transitory computer-readable media of the data encryption system 106. In addition to the foregoing, one or more embodiments can also be described in terms of flowcharts comprising acts for accomplishing a particular result, as shown in FIGS. 8 and 9. FIGS. 8 and 9 may be performed with more or fewer acts. Further, the acts may be performed in differing orders. Additionally, the acts described herein may be repeated or performed in parallel with one another or parallel with different instances of the same or similar acts.

FIG. 8 illustrates a flowchart of a series of acts 800 for generating encrypted data packages in accordance with one or more implementations. While FIG. 8 illustrates acts according to one embodiment, alternative embodiments may omit, add to, reorder, and/or modify any of the acts shown in FIG. 8. The acts of FIG. 8 can be performed as part of a computer-implemented method. Alternatively, a non-transitory computer-readable medium can comprise instructions that, when executed by one or more processors, cause a computing device to perform the acts of FIG. 8. In some embodiments, a system can perform the acts of FIG. 8.

As shown in FIG. 8, the series of acts 800 include an act 802 of identifying a digital secret. In one or more embodiments, the act 802 includes obtaining a digital secret from a digital secret vault server. In some embodiments, the act 802 includes obtaining a digital secret from one or more regional storage servers. In some instances, the act 802 includes identifying an updated version of a digital secret. In some cases, the act 802 also includes generating an identifier for an encrypted data package based on a hash value of a digital secret. In addition, in some embodiments, the act 802 includes utilizing a first identifier to identify updates to a digital secret across a digital secret vault server, a first regional storage server, and a second regional storage server. Additionally, in some embodiments, the act 802 includes identifying an updated version a digital secret by comparing a hash value of a digital secret to a hash value of the updated version of the digital secret.

As further shown in FIG. 8, the series of acts 800 include an act 804 of generating an encrypted data package. In some embodiments, the act 804 includes generating, utilizing an envelope key, an encrypted digital secret from a digital secret. Furthermore, the act 804 includes generating an encrypted data package comprising an encrypted digital secret and an encrypted envelope key. For instance, the act 804 includes generating an encrypted data package by combining an encrypted digital secret and an encrypted envelope key.

As part of the act 804 and as shown in FIG. 8, the series of acts 800 also include an act of 806 of determining an envelope key. For example, the act 806 includes determining an encrypted envelope key that is an envelope key encrypted utilizing a management key of a key management system. In some cases, the act 806 includes providing an access credential corresponding to a management key to a key management system to obtain an envelope key.

In addition, in some embodiments, the act 806 includes obtaining an envelope key from a key management system without accessing a management key from the key management system. Furthermore, in one or more embodiments, the act 806 includes determining an additional encrypted envelope key reflecting an additional envelope key encrypted utilizing an additional management key of the key management system. Additionally, in one or more embodiments, the act 806 includes rotating an envelope key to generate updated encrypted data packages for updated versions of a digital secret for a regional storage server.

As part of the act 804 and as shown in FIG. 8, the series of acts 800 also include an act 808 of encrypting a digital secret. For example, the act 808 includes generating an encrypted digital secret from a digital secret utilizing an envelope key. Additionally, in one or more embodiments, the act 808 includes generating an updated encrypted digital secret from an updated version of a digital secret utilizing an envelope key. In some instances, the act 808 includes generating, utilizing an additional envelope key, an additional encrypted digital secret from the digital secret.

In some embodiments, the act 808 includes generating a first and second encrypted data package. For example, the first encrypted data package includes a first encrypted digital secret from a digital secret obtained from a digital secret vault server and a first encrypted envelope key generated from a first envelope key. In addition, the second encrypted data package includes a second encrypted digital secret from a digital secret obtained from a digital secret vault server and a second encrypted envelope key generated from a second envelope key.

In some embodiments, the act 808 includes synchronizing a first regional storage server and a second regional storage server (to an updated version of a digital secret). For instance, the act 808 includes generating, utilizing a first envelope key, a first updated encrypted digital secret from an updated version of the digital secret. Additionally, in one or more embodiments, the act 808 includes generating, utilizing a second envelope key, a second updated encrypted digital secret from an updated version of the digital secret.

Furthermore, as further shown in FIG. 8, the series of acts 800 includes an act 810 of providing the encrypted data package to a regional storage server. For example, the act 810 includes providing an encrypted data package to a regional storage server such that a regional computing device decrypts an encrypted envelope key via a management key of a key management system and utilizes the envelope key to decrypt the encrypted digital secret. In some cases, the act 810 includes providing an updated encrypted data package to a regional storage server. For example, the updated encrypted data package includes an updated encrypted digital secret and an encrypted envelope key.

Furthermore, in some embodiments, the act 810 includes providing an encrypted data package to an additional regional storage server such that an additional regional computing device decrypts an encrypted envelope key via a management key of the key management system and utilizes the envelope key to decrypt the encrypted digital secret. In some cases, the act 810 includes providing an additional encrypted data package to an additional regional storage server such that an additional regional computing device accesses a key management system to decrypt an additional encrypted envelope key via an additional management key and utilizes the additional envelope key to decrypt the encrypted digital secret.

In one or more embodiments, the act 810 includes providing a first encrypted data package to a first regional storage server such that a first regional computing device decrypts a first encrypted envelope key via a first management key of a key management system and utilizes the first envelope key to decrypt the first encrypted digital secret. Furthermore, in some embodiments, the act 810 includes providing a second encrypted data package to a second regional storage server such that a second regional comput-ing device decrypts the second encrypted envelope key via a second management key of the key management system and utilizes the second envelope key to decrypt the second encrypted digital secret.

In some cases, the act 810 includes synchronizing a first regional storage server and a second regional storage server. In particular, in one or more embodiments, the act 810 includes providing a first updated encrypted data package to a first regional storage server. For instance, a first updated encrypted data package includes a first updated encrypted digital secret and a first encrypted envelope key. Furthermore, the act 810 includes providing a second updated encrypted data package to a second regional storage server. For example, a second updated encrypted data package includes a second updated encrypted digital secret and a second encrypted envelope key.

FIG. 9 illustrates a flowchart of a series of acts 900 for accessing a digital secret from an encrypted data package in accordance with one or more implementations. While FIG. 9 illustrates acts according to one embodiment, alternative embodiments may omit, add to, reorder, and/or modify any of the acts shown in FIG. 9. The acts of FIG. 9 can be performed as part of a computer-implemented method. Alternatively, a non-transitory computer-readable medium can comprise instructions that, when executed by one or more processors, cause a computing device to perform the acts of FIG. 9. In some embodiments, a system can perform the acts of FIG. 9.

For example, as shown in FIG. 9, the series of acts 900 includes an act 902 of retrieving an encrypted data package from a regional storage server. In particular, in one or more embodiments, the act 902 includes retrieving an encrypted data package from a regional storage server. For example, an encrypted data package includes an encrypted digital secret reflecting a digital secret encrypted utilizing an envelope key and an encrypted envelope key reflecting the envelope key encrypted utilizing a management key hosted on a key management system. In some cases, the act 902 includes retrieving an updated encrypted data package from a regional storage server. For example, an updated encrypted data package includes an updated encrypted digital secret and an encrypted envelope key.

As shown in FIG. 9, the series of acts 900 includes an act 904 of determining an envelope key. In particular, in one or more embodiments, the act 904 includes determining an envelope key from an encrypted envelope key utilizing a management key hosted on a key management system.

As part of the act 904 and as shown in FIG. 9, the series of acts 900 includes an act 906 of communicating with a key management system. For instance, the act 906 includes determining an envelope key from an encrypted envelope key by providing access credentials to a key management system to cause the key management system to utilize the management key to decrypt the encrypted envelope key. Furthermore, the act 906 includes retrieving a decrypted envelope key from the key management system.

As shown in FIG. 9, the series of acts 900 includes an act 908 of extracting a digital secret from the encrypted data. For example, the act 908 includes extracting a digital secret from an encrypted data package by decrypting the encrypted digital secret utilizing a determined envelope key. In addition, the act 908 includes extracting a digital secret without accessing a management key hosted on a key management system. Furthermore, the act 908 includes extracting an updated digital secret from an encrypted data package by decrypting an updated encrypted digital secret utilizing an envelope key.

Implementations of the present disclosure may comprise or utilize a special purpose or general-purpose computer including computer hardware, such as, for example, one or more processors and system memory, as discussed in greater detail below. Implementations within the scope of the present disclosure also include physical and other computer-readable media for carrying or storing computer-executable instructions and/or data structures. In particular, one or more of the processes described herein may be implemented at least in part as instructions embodied in a non-transitory computer-readable medium and executable by one or more computing devices (e.g., any of the media content access devices described herein). In general, a processor (e.g., a microprocessor) receives instructions, from a non-transitory computer-readable medium, (e.g., memory), and executes those instructions, thereby performing one or more processes, including one or more of the processes described herein.

Computer-readable media can be any available media that can be accessed by a general purpose or special purpose computer system. Computer-readable media that store computer-executable instructions are non-transitory computer-readable storage media (devices). Computer-readable media that carry computer-executable instructions are transmission media. Thus, by way of example, and not limitation, implementations of the disclosure can comprise at least two distinctly different kinds of computer-readable media: non-transitory computer-readable storage media (devices) and transmission media.

Non-transitory computer-readable storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to non-transitory computer-readable storage media (devices) (or vice versa). For example, computer-executable instructions or data structures received over a network or data link can be buffered in RAM within a network interface module (e.g., a "NIC"), and then eventually transferred to computer system RAM and/or to less volatile computer storage media (devices) at a computer system. Thus, it should be understood that non-transitory computer-readable storage media (devices) can be included in computer system components that also (or even primarily) utilize transmission media.

Computer-executable instructions comprise, for example, instructions and data which, when executed by a processor, cause a general-purpose computer, special purpose computer, or special purpose processing device to perform a certain function or group of functions. In some implementations, computer-executable instructions are executed by a general-purpose computer to turn the general-purpose computer into a special purpose computer implementing elements of the disclosure. The computer-executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the disclosure may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Implementations of the present disclosure can also be implemented in cloud computing environments. As used herein, the term "cloud computing" refers to a model for enabling on-demand network access to a shared pool of configurable computing resources. For example, cloud computing can be employed in the marketplace to offer ubiquitous and convenient on-demand access to the shared pool of configurable computing resources. The shared pool of configurable computing resources can be rapidly provisioned via virtualization and released with low management effort or service provider interaction, and then scaled accordingly.

A cloud-computing model can be composed of various characteristics such as, for example, on-demand self-service, broad network access, resource pooling, rapid elasticity, measured service, and so forth. A cloud-computing model can also expose various service models, such as, for example, Software as a Service ("SaaS"), Platform as a Service ("PaaS"), and Infrastructure as a Service ("IaaS"). A cloud-computing model can also be deployed using different deployment models such as private cloud, community cloud, public cloud, hybrid cloud, and so forth. In addition, as used herein, the term "cloud-computing environment" refers to an environment in which cloud computing is employed.

Figure 10:
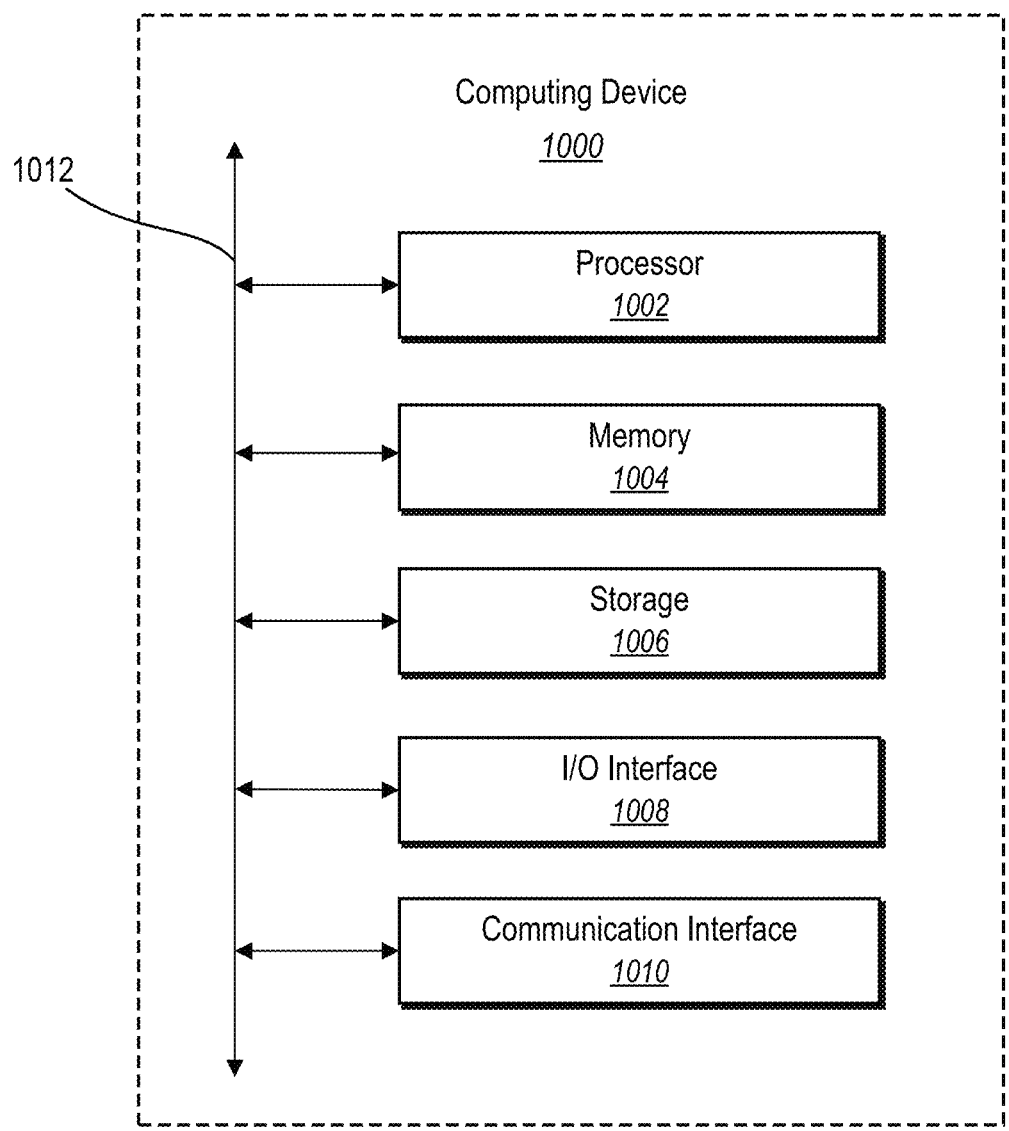
FIG. 10 illustrates a block diagram of an example computing device in accordance with one or more implementations.

FIG. 10 illustrates a block diagram of an example computing device 1000 that may be configured to perform one or more of the processes described above. One will appreciate that one or more computing devices, such as the computing device 1000 may represent the computing devices described above (e.g., computing device 700, server device(s) 102, regional storage servers 114a-114n, regional computing devices 116a-116n, administrator device 118, digital secret vault server 110). In one or more implementations, the computing device 1000 may be a mobile device (e.g., a mobile telephone, a smartphone, a PDA, a tablet, a laptop, a camera, a tracker, a watch, a wearable device, etc.). In some implementations, the computing device 1000 may be a non-mobile device (e.g., a desktop computer or another type of client device). Further, the computing device 1000 may be a server device that includes cloud-based processing and storage capabilities.

As shown in FIG. 10, the computing device 1000 can include one or more processor(s) 1002, memory 1004, a storage device 1006, input/output interfaces 1008 (or "I/O interfaces 1008"), and a communication interface 1010, which may be communicatively coupled by way of a communication infrastructure (e.g., bus 1012). While the computing device 1000 is shown in FIG. 10, the components illustrated in FIG. 10 are not intended to be limiting. Additional or alternative components may be used in other implementations. Furthermore, in certain implementations, the computing device 1000 includes fewer components than those shown in FIG. 10. Components of the computing device 1000 shown in FIG. 10 will now be described in additional detail.

In particular implementations, the processor(s) 1002 includes hardware for executing instructions, such as those making up a computer program. As an example, and not by way of limitation, to execute instructions, the processor(s) 1002 may retrieve (or fetch) the instructions from an internal register, an internal cache, memory 1004, or a storage device 1006 and decode and execute them.

The computing device 1000 includes memory 1004, which is coupled to the processor(s) 1002. The memory 1004 may be used for storing data, metadata, and programs for execution by the processor(s). The memory 1004 may include one or more of volatile and non-volatile memories, such as Random-Access Memory ("RAM"), Read-Only Memory ("ROM"), a solid-state disk ("SSD"), Flash, Phase Change Memory ("PCM"), or other types of data storage. The memory 1004 may be internal or distributed memory.

The computing device 1000 includes a storage device 1006 includes storage for storing data or instructions. As an example, and not by way of limitation, the storage device 1006 can include a non-transitory storage medium described above. The storage device 1006 may include a hard disk drive ("HDD"), flash memory, a Universal Serial Bus ("USB") drive or a combination these or other storage devices.

As shown, the computing device 1000 includes one or more I/O interfaces 1008, which are provided to allow a user to provide input to (such as user strokes), receive output from, and otherwise transfer data to and from the computing device 1000. These I/O interfaces 1008 may include a mouse, keypad or a keyboard, a touch screen, camera, optical scanner, network interface, modem, other known I/O devices or a combination of such I/O interfaces 1008. The touch screen may be activated with a stylus or a finger.

The I/O interfaces 1008 may include one or more devices for presenting output to a user, including, but not limited to, a graphics engine, a display (e.g., a display screen), one or more output drivers (e.g., display drivers), one or more audio speakers, and one or more audio drivers. In certain implementations, I/O interfaces 1008 are configured to provide graphical data to a display for presentation to a user. The graphical data may be representative of one or more graphical user interfaces and/or any other graphical content as may serve a particular implementation.

The computing device 1000 can further include a communication interface 1010. The communication interface 1010 can include hardware, software, or both. The communication interface 1010 provides one or more interfaces for communication (such as, for example, packet-based communication) between the computing device and one or more other computing devices or one or more networks. As an example, and not by way of limitation, communication interface 1010 may include a network interface controller ("NIC") or network adapter for communicating with an Ethernet or other wire-based network or a wireless NIC ("WNIC") or wireless adapter for communicating with a wireless network, such as a WI-FI. The computing device 1000 can further include a bus 1012. The bus 1012 can include hardware, software, or both that connects components of computing device 1000 to each other.

In the foregoing specification, the invention has been described with reference to specific example implementations thereof. Various implementations and aspects of the invention(s) are described with reference to details discussed herein, and the accompanying drawings illustrate the various implementations. The description above and drawings are illustrative of the invention and are not to be construed as limiting the invention. Numerous specific details are described to provide a thorough understanding of various implementations of the present invention.

The present invention may be embodied in other specific forms without departing from its spirit or essential characteristics. The described implementations are to be considered in all respects only as illustrative and not restrictive. For example, the methods described herein may be performed with less or more steps/acts or the steps/acts may be performed in differing orders. Additionally, the steps/acts described herein may be repeated or performed in parallel to one another or in parallel to different instances of the same or similar steps/acts. The scope of the invention is, therefore, indicated by the appended claims rather than by the foregoing description. All changes that come within the meaning and range of equivalency of the claims are to be embraced within their scope.

What is claimed is:

1. A data encryption system comprising:
   one or more memory devices comprising a first envelope key and a digital secret, wherein the first envelope key comprises a first cryptographic key for encrypting or decrypting the digital secret and wherein the digital secret comprises a set of storable digital data; and
   one or more processors configured to cause the data encryption system to:
   generate a first encrypted digital secret from the digital secret by, utilizing the first envelope key to encrypt the digital secret;
   determine a first encrypted envelope key reflecting the first envelope key encrypted utilizing a first management key of a key management system, wherein the first management key comprises a second cryptographic key to encrypt or decrypt envelope keys for a first geographic region;
   generate a first encrypted data package comprising a collection of the first encrypted digital secret, an identifier for the digital secret, and the first encrypted envelope key;
   provide the first encrypted data package to a first regional storage server of the first geographic region to cause a first regional computing device operating in the first geographic region to access the first envelope key decrypted from the first encrypted envelope key through the first management key of the key management system and utilize the first envelope key to decrypt the first encrypted digital secret, wherein the first regional storage server is accessible by a first set of client devices corresponding to geographic locations within the first geographic region;

in response to receiving a first data request from a client device corresponding to the first set of client devices for the first regional storage server, utilize an access credential corresponding to the client device to cause the key management system to utilize the first management key to decrypt the first encrypted digital secret from the first encrypted data package for the client device;

provide a second encrypted data package, corresponding to a second geographic region, comprising a collection of a second encrypted envelope key from second envelope key encrypted using a second management key, a second encrypted digital secret from encrypting the same digital secret utilizing the second envelope key to a second regional storage server different from the first regional storage server, and the identifier for the digital secret, wherein the second regional storage server corresponds to the second geographic region and is accessible by a second set of client devices corresponding to additional geographic locations within the second geographic region, wherein in the first management key is different from the second management key;

detect a server downtime at the first regional storage server;

receive a second data request from the client device corresponding to the first set of client devices for the first regional storage server, wherein the second data request comprises the identifier; and based on the detected server downtime at the first regional storage server:
cause the second regional storage server to provide the second encrypted data package to the client device based on the identifier associated with the second data request; and
utilize the access credential corresponding to the client device to cause the key management system to utilize the second management key to decrypt the second encrypted digital secret from the second encrypted data package for the client device.

2. The data encryption system of claim 1, wherein the one or more processors are further configured to cause the data encryption system to:
identify an updated version of the digital secret by comparing a first hash value identifier from the identifier of the digital secret to a second hash value identifier of the updated version of the digital secret;
generate, utilizing the first envelope key, an updated first encrypted digital secret from the updated version of the digital secret; and
provide an updated first encrypted data package to the first regional storage server, the updated first encrypted data package comprising the updated first encrypted digital secret, an updated identifier, and the first encrypted envelope key.

3. The data encryption system of claim 1, wherein the one or more processors are further configured to cause the data encryption system to utilize a password-based access credential corresponding to the client device to the key management system to utilize the first management key to decrypt the first encrypted digital secret from the first encrypted data package for the client device.

4. The data encryption system of claim 2, wherein the one or more processors are further configured to cause the data encryption system to:
determine a difference between the updated first encrypted digital secret and the second encrypted digital secret by comparing the second hash value identifier corresponding to the updated first encrypted digital secret and a third hash value identifier from the identifier corresponding to the second encrypted digital secret;
based on the determined difference between the updated first encrypted digital secret and the second encrypted digital secret, generate, utilizing the second envelope key, an updated second encrypted digital secret from the updated version of the digital secret of the updated first encrypted digital secret; and
provide an updated second encrypted data package to the second regional storage server, the updated second encrypted data package comprising the collection of the updated second encrypted digital secret, the updated identifier for the digital secret, and the second encrypted envelope key.

5. The data encryption system of claim 1, wherein the one or more processors are further configured to cause the data encryption system to utilize the same access credential corresponding to the client device at the key management system to access the first management key and the second management key.

6. The data encryption system of claim 1, wherein the one or more processors are further configured to cause the data encryption system to:
provide the first encrypted envelope key to the first set of client devices based on geographic locations of the first set of client devices corresponding to the first geographic region of the first regional storage server; and
provide the second encrypted envelope key to the second set of client devices based on geographic locations of the second set of client devices corresponding to the second geographic region of the second regional storage server.

7. The data encryption system of claim 1, wherein the one or more processors are further configured to cause the data encryption system to generate the identifier for the digital secret by generating a hash-based identifier representing a version of the digital secret.

8. The data encryption system of claim 1, wherein the first envelope key is different from the second envelope key.

9. A non-transitory computer-readable medium storing instructions that, when executed by at least one processor, cause:
a first computing device, operating in a first geographic region, to:
retrieve a first encrypted data package from a first regional storage server of a data encryption system accessible by a first set of client devices corresponding to the first geographic region, the first encrypted data package comprising a first encrypted digital secret reflecting a digital secret encrypted utilizing a first envelope key, an identifier for the digital secret, and a first encrypted envelope key reflecting the first envelope key encrypted utilizing a first management key hosted on a key management system using an access credential corresponding to the first computing device, wherein:
the digital secret represents a set of storable digital data; and the first envelope key comprises a first cryptographic key to encrypt or decrypt the digital secret;
determine the first envelope key from the first encrypted envelope key utilizing the first management key hosted on the key management system; and
extract the digital secret from the first encrypted data package by decrypting the first encrypted digital secret utilizing the determined first envelope key;
a second computing device, operating in a second geographic region, to:
retrieve a second encrypted data package from a second regional storage server of the data encryption system accessible by a second set of client devices corresponding to the second geographic region, the second encrypted data package comprising a second encrypted digital secret reflecting the digital secret encrypted utilizing a second envelope key, the identifier for the digital secret, and a second encrypted envelope key reflecting the second envelope key encrypted utilizing a second management key hosted on the key management system, wherein the second management key is different from the first management key;
determine the second envelope key from the second encrypted envelope key utilizing the second management key hosted on the key management system; and
extract the digital secret from the second encrypted data package by decrypting the second encrypted digital secret utilizing the determined second envelope key; and
the first computing device, operating in the first geographic region, further to:
detect a server downtime at the first regional storage server; and
based on the detected server downtime at the first regional storage server and a data request comprising the identifier for the digital secret:
retrieve the second encrypted data package from the second regional storage server based on the identifier associated with the data request; and
utilize the access credential corresponding to the first computing device to cause the key management system to utilize the second management key to decrypt the second encrypted digital secret from the second encrypted data package for the first computing device corresponding to the first regional storage server.

10. The non-transitory computer-readable medium of claim 9, further comprising instructions that, when executed by the at least one processor, cause the first computing device to determine the first envelope key from the first encrypted envelope key by:
providing the access credential to the key management system to cause the key management system to utilize the first management key to decrypt the first encrypted envelope key to obtain a decrypted first envelope key; and
retrieving the decrypted first envelope key from the key management system.

11. The non-transitory computer-readable medium of claim 9, further comprising instructions that, when executed by the at least one processor, cause the first computing device to: extract the digital secret without accessing the first management key hosted on the key management system.

12. The non-transitory computer-readable medium of claim 9, further comprising instructions that, when executed by the at least one processor, cause the first computing device to:
retrieve an updated first encrypted data package from the first regional storage server, the updated first encrypted data package comprising an updated first encrypted digital secret and the first encrypted envelope key; and
extract an updated digital secret from the first encrypted data package by decrypting the updated first encrypted digital secret utilizing the first envelope key.

13. A computer-implemented method comprising:
generating, by a data encryption system, a first encrypted data package comprising a collection of a first encrypted digital secret from a digital secret obtained from a digital secret vault server, an identifier for the digital secret, and a first encrypted envelope key generated from a first envelope key, wherein the digital secret represents a set of storable digital data and the first envelope key comprises a cryptographic key to encrypt or decrypt the digital secret;
generating, by the data encryption system, a second encrypted data package comprising a second encrypted digital secret from the same digital secret obtained from the digital secret vault server, the identifier for the digital secret, and a second encrypted envelope key generated from a second envelope key;
providing, by the data encryption system, the first encrypted data package to a first regional storage server of a first geographic region to enable a first regional computing device operating in the first geographic region to decrypt the first encrypted envelope key via a first management key of a key management system and utilize the first envelope key to decrypt the first encrypted digital secret, wherein the first regional storage server is accessible by a first set of computing devices corresponding to geographic locations within the first geographic region;
in response to receiving a first data request from a computing device corresponding to the first set of computing devices for the first regional storage server, causing, by the data encryption system, the key management system to utilize the first management key to decrypt the first encrypted digital secret from the first encrypted data package for the computing device utilizing an access credential corresponding to the computing device;
providing, by the data encryption system, the second encrypted data package to a second regional storage server of a second geographic region to enable a second regional computing device operating in the second geographic region to decrypt the second encrypted envelope key via a second management key of the key management system, the identifier for the digital secret, and utilize the second envelope key to decrypt the second encrypted digital secret, wherein the first regional storage server is different from the second regional storage server and the first management key is different from the second management key; and
in response to receiving a second data request from the computing device and detecting a server downtime at the first regional storage server, wherein the second data request comprises the identifier:
causing, by the data encryption system, the second regional storage server to provide the second encrypted data package to the computing device based on the identifier associated with the second data request; and causing, by the data encryption system, the key management system to utilize the second management key to decrypt the second encrypted digital secret from the second encrypted data package for the computing device utilizing the access credential corresponding to the computing device.

14. The computer-implemented method of claim 13, further comprising:

identifying an updated version of the digital secret from the digital secret vault server; and synchronizing the first regional storage server and the second regional storage server to the updated version of the digital secret.

15. The computer-implemented method of claim 14, further comprising synchronizing the first regional storage server and the second regional storage server by:

generating, utilizing the first envelope key, a first updated encrypted digital secret from the updated version of the digital secret; and generating, utilizing the second envelope key, a second updated encrypted digital secret from the updated version of the digital secret.

16. The computer-implemented method of claim 15, further comprising synchronizing the first regional storage server and the second regional storage server by:

providing a first updated encrypted data package to the first regional storage server, the first updated encrypted data package comprising the first updated encrypted digital secret, an updated identifier for the updated version of the digital secret, and the first encrypted envelope key; and providing a second updated encrypted data package to the second regional storage server, the second updated encrypted data package comprising the second updated encrypted digital secret, the updated identifier for the updated version of the digital secret, and the second encrypted envelope key.

17. The computer-implemented method of claim 13, further comprising:

generating the identifier for the digital secret in the first encrypted data package and the second encrypted data package based on a hash value of the digital secret; and utilizing the identifier to identify updates to the digital secret across the digital secret vault server, the first regional storage server, and the second regional storage server.

18. The computer-implemented method of claim 13, further comprising generating the first encrypted data package by:

providing the access credential to the key management system to obtain the first envelope key;

utilizing the first envelope key to generate the first encrypted digital secret from the digital secret; and combining the first encrypted digital secret, the identifier, and the first encrypted envelope key.

19. The computer-implemented method of claim 13, wherein the first encrypted envelope key comprises the first envelope key encrypted utilizing the first management key of the key management system and further comprising obtaining the first envelope key from the key management system without accessing the first management key of the key management system.

20. The computer-implemented method of claim 13, further comprising rotating the first envelope key to generate updated encrypted data packages for updated versions of the digital secret for the first regional storage server.

* * * * *